United States Patent
Aoki et al.

(10) Patent No.: US 9,528,424 B2
(45) Date of Patent: Dec. 27, 2016

(54) MALFUNCTION DIAGNOSIS DEVICE FOR EXHAUST GAS PURIFICATION DEVICE OF INTERNAL COMBUSTION ENGINE

(71) Applicant: TOYOTA JIDOSHA KABUSHIKI KAISHA, Toyota-shi, Aichi-ken (JP)

(72) Inventors: Keiichiro Aoki, Shizuoka-ken (JP); Toyoharu Kaneko, Susono (JP); Hiroki Nishijima, Nisshin (JP)

(73) Assignee: TOYOTA JIDOSHA, KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/057,515

(22) Filed: Mar. 1, 2016

(65) Prior Publication Data
US 2016/0258334 A1 Sep. 8, 2016

(30) Foreign Application Priority Data
Mar. 3, 2015 (JP) .................. 2015-040841

(51) Int. Cl.
*F01N 3/00* (2006.01)
*F01N 3/02* (2006.01)
(Continued)

(52) U.S. Cl.
CPC ........... *F01N 11/007* (2013.01); *F01N 3/2066* (2013.01); *F01N 2550/02* (2013.01)

(58) Field of Classification Search
CPC .......... F01N 11/00; F01N 3/208; F01N 9/005; F01N 2550/02; F01N 2560/021; F01N 2560/026; F01N 2560/06; F01N 2610/02; F01N 2900/1402; F01N 2900/1404; F01N 2900/1616; F01N 2900/1621; Y02T 10/24; Y02T 10/47
(Continued)

(56) References Cited

U.S. PATENT DOCUMENTS

2003/0046928 A1 3/2003 van Nieuwstadt
2003/0159928 A1 8/2003 Kojima et al.
(Continued)

FOREIGN PATENT DOCUMENTS

DE 10237490 A1 5/2003
EP 0791827 A1 8/1997
(Continued)

*Primary Examiner* — Audrey K Bradley
*Assistant Examiner* — Dapinder Singh
(74) *Attorney, Agent, or Firm* — Andrews Kurth Kenyon LLP

(57) ABSTRACT

The invention relates to a malfunction diagnosis device for an exhaust gas purification catalyst of an engine. The device calculates, on the basis of a parameter of the engine other than an output value of a NOx concentration sensor, (a) an estimated NO concentration of the exhaust gas and expected to flow out from the catalyst and (b) an estimated particular component concentration of the exhaust gas and expected to flow out from the catalyst. The device calculates an expected output value such that the expected output value calculated when the influence parameter value is a first value is smaller than the expected output value calculated when the influence parameter value is a second value, the expected output value being an output value which is expected to be output from the sensor when the exhaust gas, which includes NO having the expected NO concentration and the particular component having the expected particular component concentration, reaches the sensor. The device diagnoses that a malfunction occurs in the catalyst when the output value of the sensor is equal to or larger than a malfunction diagnosis threshold defined on the basis of the expected output value.

7 Claims, 13 Drawing Sheets

(51) Int. Cl.
*F01N 3/10* (2006.01)
*F01N 3/20* (2006.01)
*F01N 11/00* (2006.01)

(58) Field of Classification Search
USPC .......................... 60/274, 277, 295, 299–301
See application file for complete search history.

(56) References Cited

U.S. PATENT DOCUMENTS

| | | |
|---|---|---|
| 2007/0199309 A1 | 8/2007 | Yano et al. |
| 2013/0104638 A1* | 5/2013 | Takahashi ............ F02D 41/1461 73/114.71 |
| 2014/0373511 A1* | 12/2014 | Osburn .............. B01D 53/9431 60/274 |
| 2015/0128564 A1* | 5/2015 | Upadhyay ............. F01N 3/2066 60/274 |
| 2015/0128565 A1* | 5/2015 | Upadhyay ................ F01N 3/18 60/274 |

FOREIGN PATENT DOCUMENTS

| | | |
|---|---|---|
| JP | H09-288084 A | 11/1997 |
| JP | 2007-121323 A | 5/2007 |
| JP | 03954462 B2 | 8/2007 |
| JP | 2009-185754 A | 8/2009 |
| WO | 2006/046339 A1 | 5/2006 |
| WO | 2011 093771 A1 | 8/2011 |
| WO | 2012 176280 A1 | 12/2012 |

\* cited by examiner

MALFUNCTION DIAGNOSIS DEVICE FOR EXHAUST GAS PURIFICATION DEVICE OF INTERNAL COMBUSTION ENGINE

CROSS-REFERENCE TO RELATED APPLICATION

The present application claims priority to Japanese Patent Application No. 2015-040841 filed on Mar. 3, 2015, which is incorporated herein by reference in its entirety.

BACKGROUND OF THE INVENTION

1. Field of the Invention

The present invention relates to a malfunction diagnosis device for diagnosing a malfunction of an exhaust gas purification catalyst for causing ammonia to purify NOx included in exhaust gas discharged from combustion chambers of an internal combustion engine.

2. Description of the Related Art

There is known an exhaust gas purification device (an SCR catalyst) for causing ammonia ($NH_3$) to purify nitrogen oxide (NOx) included in exhaust gas discharged from combustion chambers of an internal combustion engine. There is also known a method for diagnosing a malfunction that a NOx purification rate of the catalyst decreases by using a NOx concentration sensor provided downstream of the catalyst.

For example, a NOx concentration sensor described in JP 9-288084 A can be used for diagnosing a malfunction that a NOx purification rate of the catalyst decreases. This NOx concentration sensor outputs an output value or an electric current depending on amounts of NOx and ammonia included in the exhaust gas.

Accordingly, in a malfunction diagnosis of the SCR catalyst by using the NOx concentration sensor, first, concentrations of NOx and ammonia, which are expected to flow out from the catalyst when the NOx purification rate of the SCR catalyst decreases to a certain constant purification rate, is estimated by calculation. In addition, estimated is an output value of the NOx concentration sensor which is expected to be output from the NOx concentration sensor when exhaust gas including NOx and ammonia having the estimated concentrations, respectively reaches the NOx concentration sensor.

Then, when an actual output value of the NOx concentration sensor becomes equal to or larger than the estimated output value, it is diagnosed that a malfunction occurs in the SCR catalyst.

SUMMARY OF THE INVENTION

The output value of the NOx concentration sensor of a type described in JP 9-288084 A includes following output values (1) to (3).

(1) An output value derived depending on a concentration of nitrogen monoxide (NO) originally included in the exhaust gas.

(2) An output value derived depending on a concentration of nitrogen monoxide produced at the NOx concentration sensor from nitrogen dioxide ($NO_2$) included in the exhaust gas.

(3) An output value depending on a concentration of nitrogen monoxide produced at the NOx concentration sensor from ammonia included in the exhaust gas.

Therefore, when an amount of nitrogen monoxide produced from nitrogen dioxide at the NOx concentration sensor changes even under the condition that the concentration of nitrogen dioxide included in the exhaust gas reaching the NOx concentration sensor is constant, an output value of the NOx concentration sensor changes. Similarly, when an amount of nitrogen monoxide produced from ammonia at the NOx concentration sensor even under the condition that the concentration of ammonia included in the exhaust gas reaching the NOx concentration sensor is constant, an output value of the NOx concentration sensor changes.

Thus, as described above, in order to accurately estimate the output value which is expected to be output from the NOx concentration sensor, it is necessary to consider an amount of nitrogen monoxide produced from nitrogen dioxide at the NOx concentration sensor and an amount of nitrogen monoxide produced from ammonia at the NOx concentration sensor for the estimation.

The present invention is made for solving the above-mentioned problem. One of objects of the present invention is to provide a malfunction diagnosis device for an exhaust gas purification catalyst of an internal combustion engine which can accurately estimate an output value of the NOx concentration sensor which is expected to be output from the NOx concentration sensor when a malfunction occurs in the exhaust gas purification device (for example, the SCR catalyst).

The malfunction diagnosis device for the exhaust gas purification catalyst according to the present invention (hereinafter, the malfunction diagnosis device will be also referred to as "the present invention device") is applied to an internal combustion engine (10), comprising:

an exhaust passage (52);

an exhaust gas purification catalyst (53c) provided in the exhaust passage (52) for reducing nitrogen monoxide included in exhaust gas by ammonia to purify the nitrogen monoxide; and a NOx concentration sensor (77) provided in the exhaust passage (52) downstream of the exhaust gas purification catalyst (53c) for detecting a NOx concentration of the exhaust gas.

The NOx concentration sensor (77) includes a diffusion layer (93) made of porous material, through which the exhaust gas can pass, and an electrode part (94e, 94d) for reducing nitrogen monoxide included in the exhaust gas, which has passed through the diffusion layer (93), to convert the nitrogen monoxide to nitrogen and outputting an output value depending on an amount of reduction of the nitrogen monoxide at the electrode part (94e, 94d).

The present invention device comprises a malfunction diagnosis section (80) for diagnosing a malfunction of the exhaust gas purification catalyst (53c).

In the present invention device, an amount of nitrogen monoxide produced from a particular component included in the exhaust gas when the exhaust gas passes through the diffusion layer (93) is a first amount when an influence parameter value is a first value, the influence parameter value being a value of an influence parameter which influences a reaction of the particular component when the particular component passes through the diffusion layer (93), the reaction of the particular component changing an amount of nitrogen monoxide reaching the electrode part (94e, 94d).

Further, an amount of nitrogen monoxide, produced from the particular component when the particular component passes through the diffusion layer (93), is a second amount larger than the first amount when the influence parameter value is a second value.

In the present invention, for example, the particular component is nitrogen dioxide ($NO_2$) and/or ammonia ($NH_3$).

The malfunction diagnosis part (80) is programmed to calculate, on the basis of a parameter of the engine (10) other than the output value of the NOx concentration sensor (77), (a) an estimated nitrogen monoxide concentration which is a concentration of nitrogen monoxide included in the exhaust gas and expected to flow out from the exhaust gas purification catalyst (53c) and (b) an estimated particular component concentration which is a concentration of the particular component included in the exhaust gas and expected to flow out from the exhaust gas purification catalyst (53c).

Further, malfunction diagnosis section (80) is programmed to calculate an expected output value such that the expected output value calculated when the influence parameter value is the first value is smaller than the expected output value calculated when the influence parameter value is the second value, the expected output value being an output value which is expected to be output from the NOx concentration sensor (77) when the exhaust gas, which includes nitrogen monoxide having the expected nitrogen monoxide concentration and the particular component having the expected particular component concentration, reaches the NOx concentration sensor (77).

The malfunction diagnosis section (80) is programmed to diagnose that a malfunction occurs in the exhaust gas purification catalyst (53c) when the output value of the NOx concentration sensor (77) is equal to or larger than a malfunction diagnosis threshold defined on the basis of the expected output value.

The present invention device considers an amount of nitrogen monoxide produced from the particular component in the diffusion layer of the NOx concentration sensor for the estimation of an output value of the NOx concentration sensor which is estimated to be output from the NOx concentration sensor when an exhaust gas purification rate of the exhaust gas catalyst decreases to the predetermined purification rate. Therefore, the present invention device can accurately estimate or predict an output value which is estimated to be output from the NOx concentration sensor when the NOx purification ratio of the exhaust gas purification catalyst decreases to the predetermined purification rate.

In the present invention device, the influence parameter is a parameter which changes a speed of a reaction for producing a component other than the particular component from the particular component. In particular, the influence parameter is at least one of (a) a concentration of oxygen included in the exhaust gas reaching the NOx concentration sensor (77), (b) a temperature of the exhaust gas reaching the NOx concentration sensor (77), (c) a concentration of water included in the exhaust gas reaching the NOx concentration sensor (77) and (d) a temperature of the diffusion layer (93).

Further, in the present invention device, the influence parameter is a parameter which changes a time of the particular component to stay in the diffusion layer (93). In particular, the influence parameter is at least one of (a) a flow rate of the exhaust gas reaching the NOx concentration sensor (77) and (b) a thickness of the diffusion layer (93) in a direction of passage of the exhaust gas through the diffusion layer (93) toward the electrode part (94e, 94d).

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, a malfunction diagnosis device for an exhaust gas purification catalyst of an internal combustion engine according to an embodiment of the present invention will be described with reference to the drawings. Hereinafter, the malfunction diagnosis device according to the embodiment of the present invention will be referred to as "the present diagnosis device".

<Configuration of Internal Combustion Engine>

Figure 1:
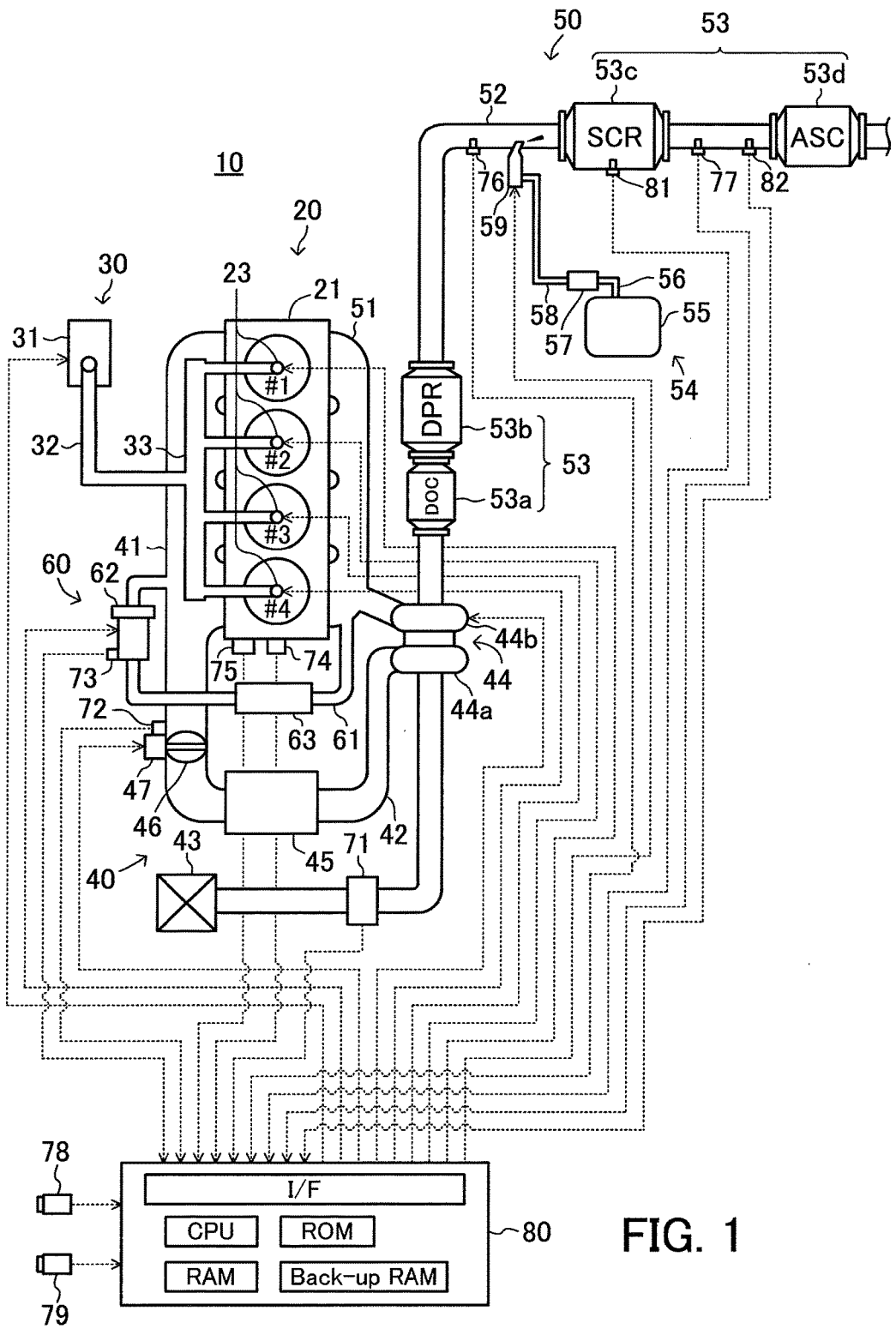
FIG. 1 shows a general view of an internal combustion engine, to which a malfunction diagnosis device for an exhaust gas purification catalyst according to an embodiment of the present invention is applied.

The present diagnosis device is applied to an internal combustion engine 10 shown in FIG. 1. The engine 10 is a multi-cylinder (in this embodiment, linear-four-cylinder) 4-cycle piston-reciprocating diesel engine. The engine 10 includes an engine body part 20, a fuel supply system 30, an intake system 40, an exhaust system 50 and an EGR system 60.

The engine body part 20 includes a body 21 including a cylinder block, a cylinder head, a crank case and the like. Four combustion chambers #1 to #4 are formed in the body 21. Fuel injectors 23 are provided at upper sides of the respective combustion chambers #1 to #4. The fuel injectors 23 open in response to commands sent from an engine ECU (an engine electronic control unit) 80 described later to inject fuel directly into the respective combustion chambers #1 to #4, respectively.

The fuel supply system 30 includes a fuel pressurizing pump 31 or a supply pump 31, a fuel delivery pipe 32 and a common rail 33 or an accumulation chamber 33. A discharge port of the fuel pressurizing pump 31 is connected in communication with the fuel delivery pipe 32. The fuel delivery pipe 32 is connected in communication with the common rail 33. The common rail 33 is connected in communication with the fuel injectors 23.

The fuel pressurizing pump 31 suctions fuel reserved in a fuel tank (not shown) and then, pressurizes the suctioned fuel. Further, the fuel pressurizing pump 31 supplies the common rail 33 with the pressurized fuel having a high pressure through the fuel delivery pipe 32.

The intake system 40 includes an intake manifold 41, an intake pipe 42, an air cleaner 43, a compressor 44a of a turbocharger 44, an intercooler 45, a throttle valve 46 and a throttle valve actuator 47.

The intake manifold 41 includes branch parts connected in communication with the respective combustion chambers #1 to #4 and a collection part connected in communication with the branch parts. The intake pipe 42 is connected in communication with the collection part of the intake manifold 41. The intake manifold 41 and the intake pipe 42 forms an intake passage.

The air cleaner 43, the compressor 44a, the intercooler 45 and the throttle valve 46 are provided in the intake pipe 42 in order in a direction from an upstream side of a flow of intake air toward a downstream side thereof. The throttle valve actuator 47 adjusts an opening degree of the throttle valve 46 in response to a command sent from the ECU 80.

The exhaust system 50 includes an exhaust manifold 51, an exhaust pipe 52, a turbine 44b of the turbocharger 44, an exhaust gas purification device 53 and an aqueous urea addition device 54.

The exhaust manifold 51 includes branch parts connected in communication with the combustion chambers #1 to #4 and a collection part connected in communication with the branch parts. The exhaust pipe 52 is connected in communication with the collection part of the exhaust manifold 51. The exhaust manifold 51 and the exhaust pipe 52 form an exhaust passage.

The turbine 44b and the exhaust gas purification device 53 are provided in the exhaust pipe 52 in order in a direction from an upstream side of a flow of exhaust gas toward a downstream side thereof.

The exhaust gas purification device 53 includes an oxidation catalyst 53a, a diesel particulate filter 53b carrying catalyst, a selective reduction NOx catalyst 53c and an ammonia oxidation catalyst (ASC) 53d. Hereinafter, the particulate filter 53b will be referred to as "the DPR 53b" and the selective reduction NOx catalyst 53c will be referred to as "the SCR catalyst 53c".

The oxidation catalyst 53a is provided in the exhaust pipe 52 at a downstream position of the turbine 44b of the turbocharger 44. The DPR 53b is provided in the exhaust pipe 52 at a downstream position of the oxidation catalyst 53a. The SCR catalyst 53c is provided in the exhaust pipe 52 at a downstream position of the DPR 53b. The ammonia oxidation catalyst 53d is provided in the exhaust pipe 52 at a downstream position of the SCR catalyst 53c.

The aqueous urea addition device 54 includes an aqueous urea tank 55, a first connection pipe 56, an aqueous urea pressurizing device 57, a second connection pipe 58 and an aqueous urea injector 59. The first connection pipe 56 connects the aqueous urea tank 55 to the aqueous urea pressurizing device 57 in communication manner. The second connection pipe 58 connects the aqueous urea pressurizing device 57 to the aqueous urea injector 59 in communication manner. The aqueous urea injector 59 is provided in the exhaust pipe 52 at an upstream position of the SCR catalyst 53c.

The aqueous urea injector 59 injects aqueous urea reserved in the aqueous urea tank 55 into the exhaust pipe 52 in response to a command sent from the ECU 80. Thereby, the aqueous urea is supplied to the SCR catalyst 53c. The aqueous urea supplied to the SCR catalyst 53c is converted to ammonia through a hydrolysis reaction shown by following chemical reaction formula (1).

$$CO(NH_2)_2 + H_2O \rightarrow 2NH_3 + CO_2 \quad (1)$$

NOx is produced due to combustion in the combustion chambers #1 to #4. The NOx is discharged to the exhaust passage and then, flows into the SCR catalyst 53c. The NOx flowing into the SCR catalyst 53c is reduced to be purified by the SCR catalyst 53c with ammonia as reduction agent produced from the aqueous urea through any of chemical reactions shown by formulas (2) to (4), respectively.

$$4NO + 4NH_3 + O_2 \rightarrow 4N_2 + 6H_2O \quad (2)$$

$$NO + NO_2 + 2NH_3 \rightarrow 2N_2 + 3H_2O \quad (3)$$

$$6NO_2 + 8NH_3 \rightarrow 7N_2 + 12H_2O \quad (4)$$

When a suitable amount of the aqueous urea as an ingredient of ammonia is supplied to the SCR catalyst 53c, the ammonia produced from the aqueous urea is used to purify the NOx. Therefore, in this case, no ammonia flows out from the SCR catalyst 53c. On the other hand, when an excessive amount of the aqueous urea is supplied to the SCR catalyst 53c, the ammonia may flow out from the SCR catalyst 53c.

The ammonia oxidation catalyst 53d oxidizes ammonia flowing out from the SCR catalyst 53c through a reaction shown by following formula (5) when the ammonia oxidation catalyst 53d is activated.

$$4NH_3 + 3O_2 \rightarrow 2N_2 + 6H_2O \quad (5)$$

The oxidation catalyst 53a oxidizes unburned hydrocarbon (unburned HC) and carbon monoxide (CO) included in the exhaust gas flowing into the oxidation catalyst 53a. In addition, the oxidation catalyst 53a has a function for increasing nitrogen dioxide concentration of the exhaust gas flowing into the oxidation catalyst 53a.

The DPR 53b is a filter for trapping particulates or soot included in the exhaust gas. Noble metal is carried on surfaces of the DPR 53b. The particulates trapped by the DPR 53b are burned by catalytic action of the noble metal when a temperature of the DPR 53b increases.

The turbocharger 44 is a known variable geometry turbocharger. Nozzle vanes (not shown) are provided in the turbine 44b to form variable nozzles. Opening degrees of the nozzle vanes are changed in response to a command sent from the ECU 80 and as a result, a boost pressure is changed or controlled.

The EGR system 60 includes an EGR pipe 61, an EGR control valve 62 and an EGR cooler 63.

The EGR pipe 61 connects a portion of the exhaust passage upstream of the turbine 44b (in particular, the exhaust manifold 51) to a portion of the intake passage downstream of the throttle valve 46 (in particular, the intake manifold 41) in communication manner. The EGR pipe 61 forms an EGR passage.

The EGR control valve 62 is provided in the EGR pipe 61. The EGR control valve 62 can change a passage sectional area of the EGR passage in response to a command sent from the ECU 80 to change an amount of the exhaust gas recirculated from the exhaust passage to the intake passage. Hereinafter, the exhaust gas recirculated from the exhaust passage to intake passage through the EGR passage will be referred to as "the EGR gas".

The EGR cooler 63 is interposed in the EGR pipe 61 for decreasing a temperature of the EGR gas passing through the EGR pipe 61.

The ECU 80 is comprised of an electronic circuit including a known microcomputer and includes a CPU, a ROM, a RAM, a back-up RAM, an interface and the like. The ECU 80 is connected to various sensors described below and receives signals from the sensors. Further, the ECU 80 is configured or programmed to send command signals or drive signals to various actuators such as the fuel injectors 23 and the aqueous urea injector 59, respectively.

In particular, the ECU 80 is connected to an air flow meter 71, a throttle valve opening degree sensor 72, an EGR control valve opening degree sensor 73, a crank angle sensor 74, a water temperature sensor 75, a NOx concentration sensor 76, a NOx concentration sensor 77, an acceleration pedal operation amount sensor 78, a vehicle speed sensor 79, a temperature sensor 81 and a temperature sensor 82.

The air flow meter 71 is provided in the intake pipe 42. The air flow meter 71 measures a mass flow rate of intake air passing through the intake passage (i.e., an intake air amount) and outputs a signal expressing the intake air amount Ga.

The throttle valve sensor 72 detects an opening degree of the throttle valve 46 (i.e., a throttle valve opening degree) and outputs a signal expressing the throttle valve opening degree TA.

The EGR control valve opening degree sensor 73 detects an opening degree of the EGR control valve 62 and outputs a signal expressing the opening degree of the EGR control valve 62.

The crank angle sensor 74 is provided in the engine body part 20. The crank angle sensor 74 outputs a signal depending on a rotation position of a crank shaft (not shown) of the engine 10 (i.e., depending on a crank angle).

The ECU 80 acquires a crank angle of the engine 10 (i.e., an absolute crank angle) with respect to the compression top dead center of predetermined on of the combustion chambers #1 to #4 on the basis of the signals output from the crank angle sensor 74 and a cam position sensor (not shown), respectively. Further, the ECU 80 acquires as an engine speed NE on the basis of the signals output from the crank angle sensor 74.

The water temperature sensor 75 detects a temperature of cooling water for cooling the engine 10 (i.e., a cooling water temperature) and outputs a signal expressing the cooling water temperature THW.

The NOx concentration sensor 76 is provided in the exhaust pipe 52 downstream of the DPR 53b and upstream of the SCR catalyst 53c. The NOx concentration sensor 76 measures a concentration of the NOx included in the exhaust gas reaching the NOx concentration sensor 76 and outputs a signal or an electric current expressing the concentration of the NOx. Hereinafter, the NOx concentration sensor 76 will be also referred to as "the upstream NOx concentration sensor 76" and the concentration of the NOx included in the exhaust gas will be also referred to as "the NOx concentration".

The NOx concentration sensor 77 is provided in the exhaust pipe 52 downstream of the SCR catalyst 53c and upstream of the ammonia oxidation catalyst 53d. As described later, the NOx concentration sensor 77 measures the concentration of the NOx and a concentration of the ammonia included in the exhaust gas reaching the NOx concentration sensor 77 and outputs a signal or an electric current expressing the concentrations of the NOx and the ammonia. Hereinafter, the NOx concentration sensor 77 will be also referred to as "the downstream NOx concentration sensor 77" and the concentration of the ammonia included in the exhaust gas will be also referred to as "the ammonia concentration".

The acceleration pedal operation amount sensor 78 detects an amount of an operation of an acceleration pedal (not shown) (i.e., an acceleration pedal operation amount) and outputs a signal expressing the acceleration pedal operation amount Accp.

The vehicle speed sensor 79 detects a travelling speed of a vehicle, on which the engine 10 is installed, and outputs a signal expressing the travelling speed SPD. Hereinafter, the travelling speed SPD will be referred to as "the vehicle speed SPD".

The temperature sensor 81 is provided on the SCR catalyst 53c. The temperature sensor 81 detects a temperature of the SCR catalyst 53c and outputs a signal expressing the temperature TSCR.

The temperature sensor 82 is provided on the exhaust pipe 52 downstream of the SCR catalyst 53c and upstream of the ammonia oxidation catalyst 53d. The temperature sensor 82 detects a temperature of the exhaust gas flowing out from the SCR catalyst 53c (i.e., an exhaust gas temperature) and outputs a signal expressing the exhaust gas temperature TEX.

<Aqueous Urea Injection Control>

In this embodiment, during the operation of the engine 10, the ECU 80 is configured or programmed to control an amount of the aqueous urea injected from the aqueous urea injector 59 on the basis of an amount QNH3 of the ammonia adsorbed on the SCR catalyst 53c to maintain an amount of the ammonia adsorbed on the SCR catalyst 53*c* within a predetermined range. Hereinafter, the amount QNH3 of the ammonia adsorbed on the SCR catalyst 53*c* will be referred to as "the ammonia adsorption amount QNH3".

In particular, the ECU 80 is configured or programmed to estimate an amount QNOX of the NOx flowing into the SCR catalyst 53*c* on the basis of the concentration CNOXin of the NOx include in the exhaust gas flowing into the SCR catalyst 53*c* and the intake air amount Ga. The concentration CNOXin of the NOx included in the exhaust gas flowing into the SCR catalyst 53*c* is measured by the upstream NOx concentration sensor 76. The intake air amount Ga is measured by the air flow meter 71. Hereinafter, the concentration CNOXin of the NOx included in the exhaust gas flowing into the SCR catalyst 53*c* will be referred to as "the inflow NOx concentration CNOXin" and the amount QNOX of the NOx flowing into the SCR catalyst 53*c* will be referred to as "the inflow NOx amount QNOX".

Further, the ECU 80 is configured or programmed to estimate a NOx purification rate RNOX of the SCR catalyst 53*c* on the basis of the inflow NOx concentration CNOXin and a concentration CNOXout of the NOx included in the exhaust gas flowing out from the SCR catalyst 53*c*. The concentration CNOXout of the NOx included in the exhaust gas flowing out from the SCR catalyst 53*c* is measured by the downstream NOx concentration sensor 77. Hereinafter, the concentration CNOXout of the NOx included in the exhaust gas flowing out from the SCR catalyst 53*c* will be referred to as "the outflow NOx concentration CNOXout".

The ECU 80 is configured or programmed to estimate an amount dQNH3*d* of the ammonia consumed for reducing the NOx in the SCR catalyst 53*c* on the basis of the estimated inflow NOx amount QNOX and the estimated NOx purification rate RNOX of the SCR catalyst 53*c*. The ECU 80 is configured or programmed to acquire, as the present ammonia adsorption amount QNH3, a value obtained by subtracting the estimated ammonia consumption amount dQNH3*d* of the ammonia consumed for reducing the NOx in the SCR catalyst 53*c* from the ammonia adsorption amount QNH3 lastly acquired as the present ammonia adsorption amount QNH3. Hereinafter, the amount dQNH3*d* of the ammonia consumed for reducing the NOx in the SCR catalyst 53*c* will be referred to as "the ammonia consumption amount dQNH3*d*".

On the other hand, when the present ammonia adsorption amount QNH3 is smaller than the smallest amount of the predetermined range, the ECU 80 is configured or programmed to causing the aqueous urea injector 59 to inject the aqueous urea having an amount for increasing the ammonia adsorption amount to within the predetermined range on the basis of a difference dQNH3 between the present ammonia adsorption amount QNH3 and the smallest amount of the predetermined range.

In this connection, the ECU 80 is configured or programmed to estimate an amount dQNH3*i* of the ammonia newly adsorbing on the SCR catalyst 53*c* on the basis of the amount of the aqueous urea injected from the aqueous urea injector 59. The ECU 80 is configured or programmed to acquire, as the present ammonia adsorption amount QNH3, a value obtained by adding the estimated amount dQNH3*i* of the ammonia newly adsorbing on the SCR catalyst 53*c* to the ammonia adsorption amount QNH3 lastly acquired as the present ammonia adsorption amount QNH3. Hereinafter, the amount dQNH3*i* of the ammonia newly adsorbing on the SCR catalyst 53*c* will be referred to as "the newly-adsorbed ammonia amount dQNH3*i*".

In this regard, as the ammonia adsorption amount QNH3 increases, the NOx purification rate RNOX of the SCR catalyst 53*c* tends to increase. However, when the ammonia adsorption amount QNH3 is excessively large, occurs a so-called ammonia slip where the ammonia flows out from the SCR catalyst 53*c*. Accordingly, the largest amount QNH3upper of the predetermined range is set to a value capable of preventing the ammonia slip from occurring. On the other hand, the smallest amount QNH3lower of the predetermined range is set to a value capable of making the NOx purification rate RNOX of the SCR catalyst 53*c* to be a required minimum purification rate.

<Inner Configuration of Downstream NOx Concentration Sensor>

Figure 2:
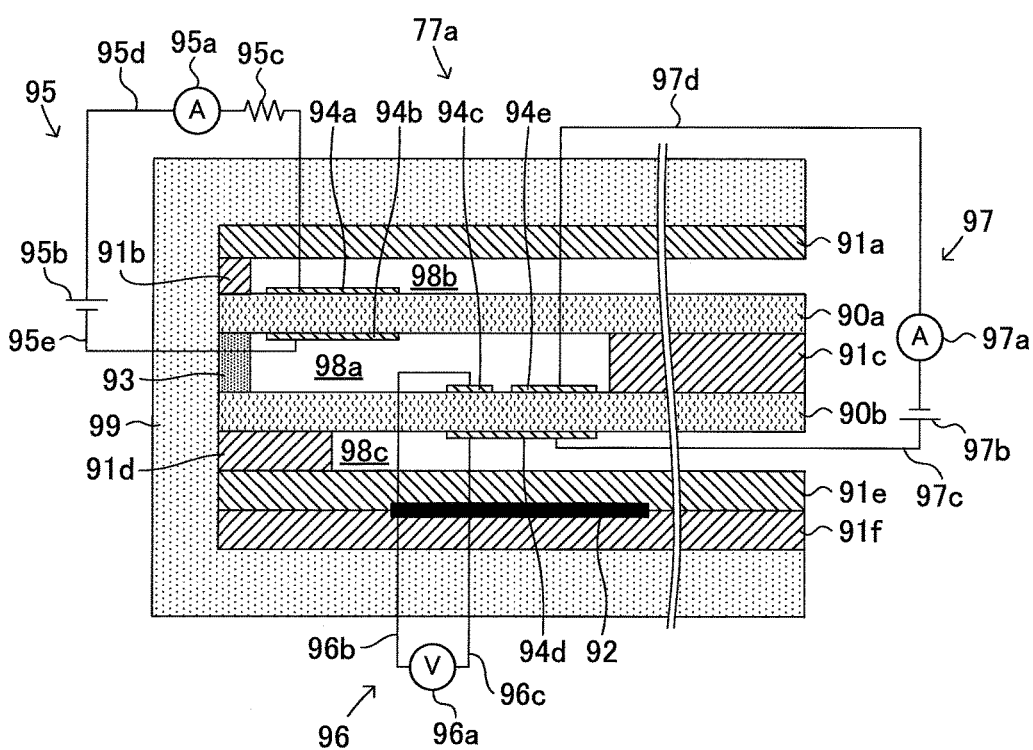
FIG. 2 shows an inner configuration of a downstream NOx concentration sensor.

Next, an inner configuration of the downstream NOx concentration sensor 77 will be described with reference to FIG. 2. An inner configuration of the upstream NOx concentration sensor 76 is the same as the inner configuration of the downstream NOx concentration sensor 77.

The downstream NOx concentration sensor 77 has a sensor element 77*a* therein. As shown in FIG. 2, the sensor element 77*a* includes two solid electrolyte layers 90*a* and 90*b*, six alumina layers 91*a* to 91*f*, a heater layer 92, a diffusion resistance layer 93, five electrodes 94*a* to 94*e* and a protection layer 99 or a diffusion layer 99.

Each of the solid electrolyte layers 90*a* and 90*b* is comprised of a thin plate made of zirconia or the like and having an oxygen ion conductive property. Each of the alumina layers 91*a* to 91*f* is comprised of a dense layer or a gas impermeable plate made of alumina. In a direction from the lower side to the upper side of FIG. 2, the alumina layer 91, the alumina layer 91*e*, the alumina layer 91*d*, the solid electrolyte layer 90*b*, the alumina layer 91*c*, the solid electrolyte layer 90*a*, the alumina layer 91*b* and the alumina layer 91*a* are stacked.

The diffusion resistance layer 93 is a porous layer and thus, the exhaust gas can pass through the diffusion resistance layer 93. The diffusion resistance layer 93 is provided between the solid electrolyte layers 90*a* and 90*b*.

A space 98*a* is defined by wall surfaces of the solid electrolyte layers 90*a* and 90*b*, the diffusion resistance layer 93 and the alumina layer 91*c*. The exhaust gas flows into the space 98*a* through the diffusion resistance layer 93 from an outside of the sensor element 77*a*. Hereinafter, the space 98*a* will be referred to as "the exhaust gas chamber 98*a*".

A space 98*b* is defined by wall surfaces of the solid electrolyte layer 90*a* and the alumina layers 91*a* and 91*b*. The space 98*b* is in communication with the outside air. Hereinafter, the space 98*b* will be referred to as "the atmospheric air chamber 98*b*".

A space 98*c* is defined by wall surfaces of the solid electrolyte layer 90*b* and the alumina layers 91*d* and 91*e*. The space 98*c* is in communication with the outside air as a base gas. Hereinafter, the space 98*c* will be referred to as "the atmospheric chamber 98*c*" or "the base gas chamber 98*c*".

The heater layer 92 is provided between the alumina layers 91*e* and 91*f*. The heater layer 92 produces heat in response to a drive signal or a command signal sent from the ECU 80 to increase a temperature of the sensor element 77*a*.

The protection layer 99 is a porous layer and thus, the exhaust gas can pass through the protection layer 99. The protection layer 99 is provided such that surfaces of the protection layer 99 are in contact with an outer surface of the solid electrolyte layer 91*a*, end surfaces of the solid electrolyte layers 90*a* and 90*b*, end surfaces of the alumina layers 91a to 91f, an end surface of the diffusion resistance layer 93 and an outer surface of the alumina layer 91f.

The protection layer 99 prevents condensed water included in the exhaust gas from adhering to the solid electrolyte layers 90a and 90b, the alumina layers 91a to 91f, the alumina layers 91d to 91f and the diffusion resistance layer 93 to prevent these layers from cracking.

The protection layer 99 traps components included in the exhaust gas, which may deteriorate the sensor element 77a, to prevent the sensor element 77a from being deteriorated.

The electrode 94b is provided on one of wall surfaces of the solid electrolyte layer 90a such that the electrode 94b locates in the exhaust gas chamber 98a. The electrode 94a is provided on the other wall surface of the solid electrolyte layer 90a such that the electrode 94a is opposed to the electrode 94b across the solid electrolyte layer 90a. The electrode 94a is provided in the atmospheric air chamber 98b.

The electrode 94a is electrically connected to a positive electrode of an electric voltage source 95b by a wiring 95d. An electric resistance 95c and an ammeter 95a are interposed in the wiring 95d in order in a direction from the electrode 94a toward the electric voltage source 95b. The ammeter 95a is electrically connected to the ECU 80. A value of electric current measured by the ammeter 95a is sent to the ECU 80. The electrode 94b is electrically connected to a negative electrode of the electric voltage source 95b by a wiring 95e. The electric current measured by the ammeter 95a is a pump section current described later.

The electrodes 94a and 94b, the solid electrolyte layer 90a, the ammeter 95a, the electric voltage source 95b, the electric resistance 95c and the wirings 95d and 95e form a pumping section 95.

The electrode 94c is provided on one of wall surfaces of the solid electrolyte layer 90b such that the electrode 94c locates in the exhaust gas chamber 98a at downstream side of the electrode 94b along a direction of flow of the exhaust gas. The electrode 94d is provided on the other wall surface of the solid electrolyte layer 90b such that the electrode 94d is opposed to the electrode 94c across the solid electrolyte layer 90b. The electrode 94d is positioned in the atmospheric air chamber 98c.

The electrode 94c is electrically connected to a voltmeter 96a via a wiring 96b. The electrode 94d is electrically connected to the voltmeter 96a via a wiring 96c. The voltmeter 96a is electrically connected to the ECU 80. A value of the electric voltage measured by the voltmeter 96a is sent to the ECU 80. The electrodes 94c and 94d, the voltmeter 96a and the wirings 96b and 96c form an oxygen concentration detection circuit 96.

The electrode 94e is provided on one of wall surfaces of the solid electrolyte layer 90b such that the electrode 94e locates in the exhaust gas chamber 98a at downstream side of the electrode 94c along the direction of the flow of the exhaust gas. The electrode 94e is provided on a wall surface of the solid electrolyte layer 90b such that the electrode 94e is opposed to the electrode 94d across the solid electrolyte layer 90b.

The electrode 94d is electrically connected to a positive electrode of an electric voltage source 97b via a wiring 97c. The electrode 94e is electrically connected to a negative electrode of the electric voltage source 97b via a wiring 97d. An ammeter 97a is interposed in the wiring 97d. The ammeter 97a is electrically connected to the ECU 80. A value of an electric current measured by the ammeter 97a is sent to the ECU 80. The electrodes 94d and 94e, the ammeter 97a, the electric voltage source 97b and the wirings 97c and 97d form a sensor section 97. The electric current measured by the ammeter 97a is a sensor section current described later.

<NOx Concentration Measurement>

Figure 3:
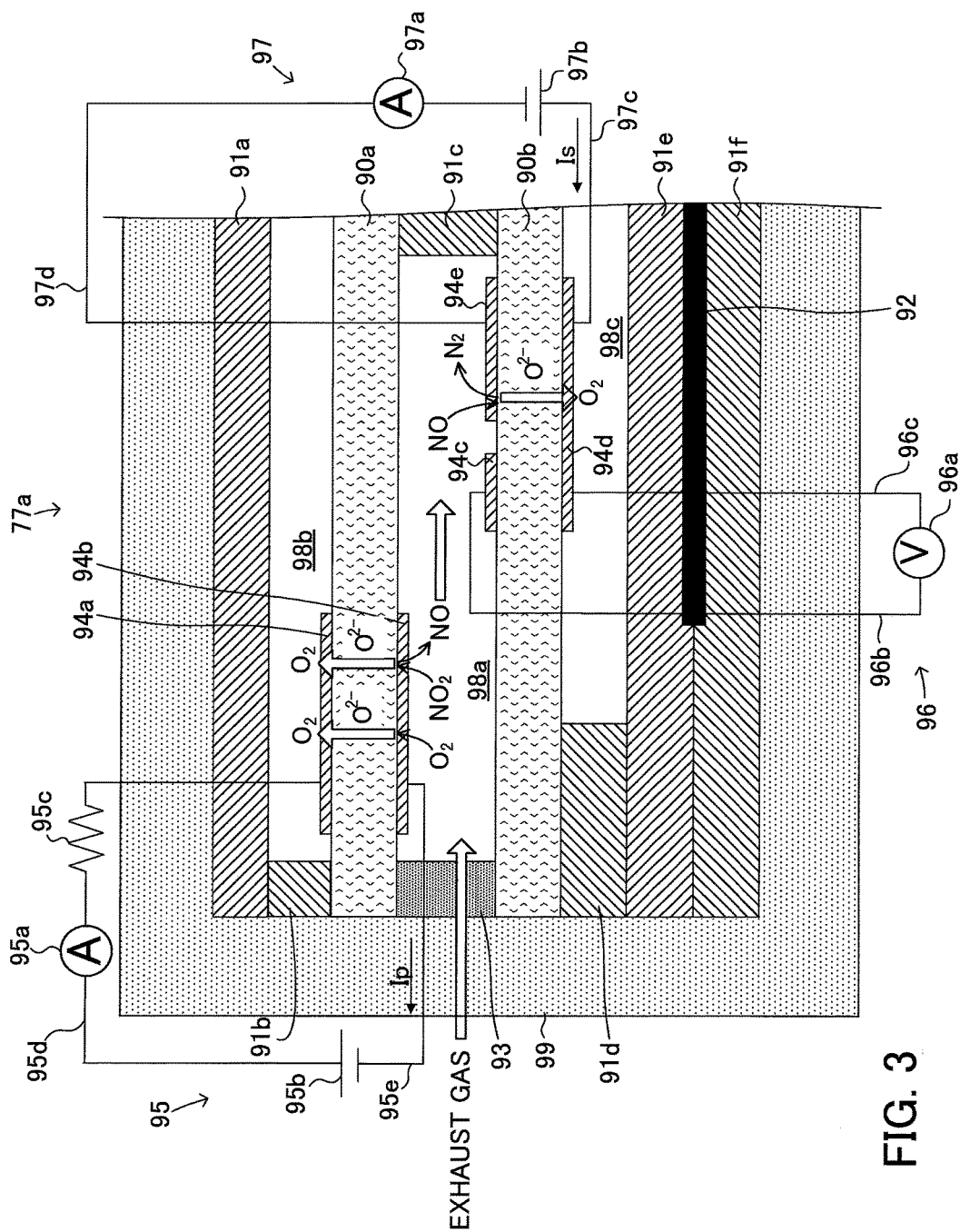
FIG. 3 shows electrochemical reaction of NOx in the downstream NOx concentration sensor.

A measurement of the concentration of the NOx included in the exhaust gas carried out by using the downstream NOx concentration sensor 77 will be described with reference to FIG. 3. A principle for measuring the NOx concentration in the exhaust gas by the upstream NOx concentration sensor 76 is the same as a principle for measuring the NOx concentration in the exhaust gas by the downstream NOx concentration sensor 77.

The exhaust gas reaching the downstream NOx concentration sensor 77 passes through the protection layer 99 and the diffusion resistance layer 93 sequentially and then, flows into the exhaust gas chamber 98a. An electric voltage is applied to between the electrodes 94a and 94b. Thereby, as shown in FIG. 3, the oxygen ($O_2$) included in the exhaust gas receives an electron ($e^-$) at the electrode 94b to become an oxygen ion ($O^{2-}$). The oxygen ion passes through the solid electrolyte layer 90a and reaches the electrode 94a. When the oxygen ion reaches the electrode 94a, the oxygen ion discharges an electron at the electrode 94a. Thus, the oxygen ion changes to the oxygen ($O_2$) and is discharged to the atmospheric air chamber 98b of the sensor element 77a.

In this manner, the passage of the oxygen ion through the solid electrolyte layer 90a causes electric current to flow in the pump section 95.

When nitrogen dioxide ($NO_2$) is included in the exhaust gas, the nitrogen dioxide is reduced at the electrode 94b to become nitrogen monoxide (NO). Oxygen ($O_2$) is produced from the reduction of the nitrogen dioxide. This produced oxygen becomes oxygen ion at the electrode 94b and then, the oxygen ion reaches the electrode 94a through the solid electrolyte layer 90a. This oxygen ion reaching the electrode 94a also discharges an electron at the electrode 94a to become the oxygen and then, is discharged to the atmospheric air chamber 98b of the sensor element 77a.

As described above, the passage of the oxygen ion, which is produced by the reduction of the nitrogen dioxide, through the solid electrolyte layer 90a causes electric current to flow in the pump section 95.

The ammeter 95a detects the electric current IP flowing in the pump section 95 as described above. Hereinafter, the electric current IP will be referred to as "the pump section current IP". The pump section current IP increases as an amount of the oxygen ion passing through the solid electrolyte layer 90a increases. In other words, the pump section current IP increases as the oxygen concentration of the exhaust gas flowing into the exhaust gas chamber 98a increases and the pump section current IP increases as the nitrogen dioxide concentration of the exhaust gas flowing into the exhaust gas chamber 98a increases.

Between the electrodes 94a and 94b, applied is electric voltage for causing electric current flowing between the electrodes 94a and 94b to be a limiting electric current for the oxygen. Thus, the oxygen concentration of the exhaust gas, which flows into the exhaust gas chamber 98a through the protection layer 99 and the diffusion resistance layer 93 from the outside of the sensor element 77a, is decreased by the pump section 95 to an extremely small constant concentration (in this embodiment, several ppm, in particular, generally zero).

Between the electrodes 94c and 94d forming the oxygen concentration detection circuit 96, generated is electric voltage (i.e., electromotive force) due to a difference between the oxygen concentration of the exhaust gas decreased by the pump section 95 and the oxygen concentration in the atmospheric air chamber 98c. The voltmeter 96a measures this electric voltage. The ECU 80 is configured or programmed to estimate the oxygen concentration of the exhaust gas decreased by the pump section 95 on the basis of the measured electric voltage. This estimated oxygen concentration is used for calculating or estimating the NOx concentration as described later.

Between the electrodes 94d and 94e forming the sensor section 97, applied is constant electric voltage by the electric voltage source 97b of the sensor section 97. Thereby, when nitrogen monoxide is included in the exhaust gas reaching the electrode 94e, this nitrogen monoxide is reduced at the electrode 94e to become nitrogen ($N_2$).

Oxygen ($O_2$) is produced due to this reduction of the nitrogen monoxide. This oxygen becomes oxygen ion at the electrode 94e. This oxygen ion passages through the solid electrolyte layer 90b and then, reaches the electrode 94d. This oxygen ion reaching the electrode 94d discharges electron at the electrode 94d to becomes the oxygen. Then, this oxygen is discharged to the atmospheric air chamber 98c of the sensor element 77a.

This passage of the oxygen ion, which is produced due to the reduction of the nitrogen monoxide, through the solid electrolyte layer 90b causes electric current IS to flow in the sensor section 97. The ammeter 97a detects this electric current IS. Hereinafter, the electric current IS will be referred to as "the sensor section current IS". The sensor section current IS increases as an amount of the oxygen ion passing through the solid electrolyte layer 90b increases. In other words, the sensor section current IS increases as the nitrogen monoxide concentration or the NOx concentration of the exhaust gas reaching the electrode 94e increases.

<Oxygen Concentration Estimation>

When oxygen is included in the exhaust gas reaching the electrode 94e of the sensor section 97, the oxygen included in the exhaust gas is also converted to oxygen ion at the electrode 94e. This oxygen ion also passes through the solid electrolyte layer 90b and then, reaches the electrode 94d. In this case, in the sensor section current IS, included are electric current produced from the oxygen produced due to the reduction of the nitrogen monoxide and electric current produced from the oxygen originally included in the exhaust gas reaching the electrode 94e. Hereinafter, the electrode 94e will be also referred to as "the sensor electrode 94e".

On the other hand, an amount of the oxygen originally included in the exhaust gas reaching the sensor electrode 94e can be estimated on the basis of the oxygen concentration detected by the oxygen concentration detection circuit 96. Accordingly, in this embodiment, the ECU 80 is configured or programmed to estimate or measure the NOx concentration in the exhaust gas flowing out from the SCR catalyst 53c on the basis of the sensor section current IS obtained by correcting the sensor section current IS, in particular, by subtracting the sensor section current, which is generated from the oxygen originally included in the exhaust gas reaching the electrode 94e, from the sensor section current IS.

In this regard, as described above, the oxygen concentration of the exhaust gas flowing into the exhaust gas chamber 98a through the protection layer 99 and the diffusion resistance layer 93 is decreased to an extremely small constant concentration by the pump section 95. Therefore, an amount of the correction of the sensor section current IS on the basis of the oxygen concentration detected by the oxygen concentration detection circuit 96 can be set to a minute constant value. In some cases, it may be unnecessary to carry out such a correction.

Similarly, the ECU 80 uses the output value of the upstream NOx concentration sensor 76 to estimate or measure the NOx concentration of the exhaust gas flowing into the SCR catalyst 53c.

<Ammonia Inflow Amount>

Figure 4:
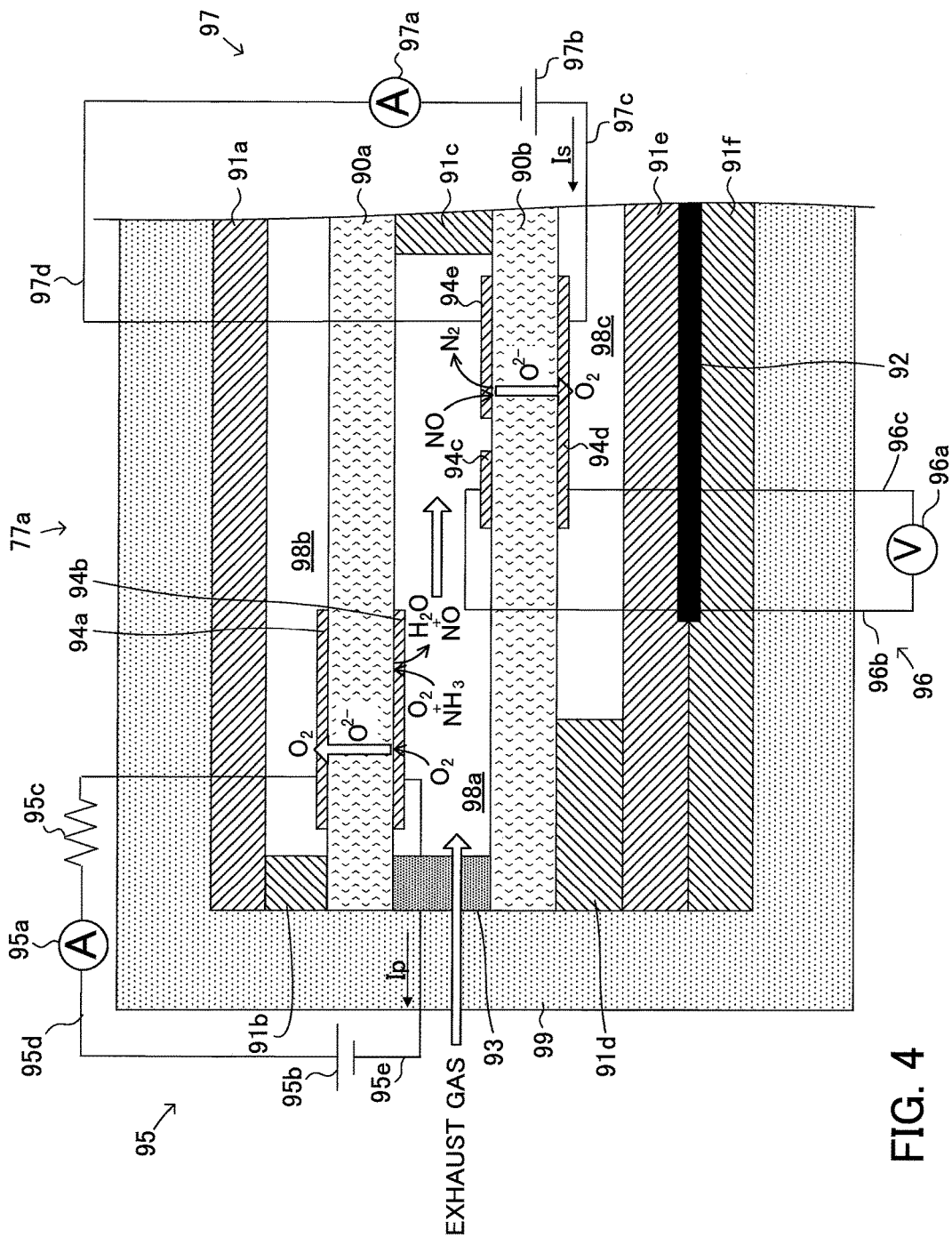
FIG. 4 shows electrochemical reaction of ammonia in the downstream NOx concentration sensor.

When an excessive amount of the aqueous urea is supplied to the SCR catalyst 53c, ammonia may flow into the exhaust gas chamber 98a. As shown in FIG. 4, the ammonia in the exhaust gas flowing into the exhaust gas chamber 98a reacts with a part of a large amount of the oxygen included in the exhaust gas at the electrode 94b of the pump section 95 to be converted to nitrogen monoxide (NO) and water ($H_2O$). Hereinafter, the electrode 94b will be also referred to as "the pump electrode 94b".

Then, the nitrogen monoxide produced from the ammonia reaches the sensor electrode 94e and as described above, is reduced to the nitrogen at the sensor electrode 94e. Due to this reduction of the nitrogen monoxide, the oxygen is produced. This produced oxygen becomes the oxygen ion at the sensor electrode 94e. This oxygen ion passes through the solid electrolyte layer 90b and reaches the electrode 94d. The oxygen ion reaching the electrode 94d discharges an electron at the electrode 94d to become oxygen and this oxygen is discharged to the atmospheric air chamber 98c of the sensor element 77a.

Such a passage of the oxygen ion discharged due to the reduction of the nitrogen monoxide produced from the ammonia through the solid electrolyte layer 90b causes electric current (i.e., the sensor section current IS) to flow in the sensor section 97. This sensor section current IS increases as an amount of the oxygen ion passing through the solid electrolyte layer 90b increases. In other words, the sensor section current IS increases as an amount of the nitrogen monoxide included in the exhaust gas reaching the sensor electrode 94e. That is, the sensor section current IS increases as an amount of the ammonia included in the exhaust gas flowing into the exhaust gas chamber 98a.

<Summary of Operation of Malfunction Diagnosis Device>

A summary of an operation of the present diagnosis device will be described. The present diagnosis device estimates the sensor section current IS which the downstream NOx concentration sensor 77 outputs when the NOx purification rate RNOX of the SCR catalyst 53c decreases to a predetermined purification rate.

In particular, the present diagnosis device estimates the concentrations of the NOx and the ammonia included in the exhaust gas which flows out from the SCR catalyst 53c when the NOx purification rate RNOX of the SCR catalyst 53c decreases to the predetermined purification rate. The predetermined purification rate is set to a value corresponding to the NOx purification ratio RNOX of the SCR catalyst 53c when it should be diagnosed that malfunction occurs in the SCR catalyst 53c. In this embodiment, the predetermined purification rate is previously set.

The present diagnosis device estimates an estimated sensor section current IS_S on the basis of a parameter/parameters other than the actual sensor section current IS of the downstream NOx concentration sensor 77. The estimated sensor section current IS_S corresponds to the sensor section current IS which the downstream NOx concentration sensor 77 outputs when the concentrations of the NOx and the ammonia flowing out from the SCR catalyst 53c corresponds to the estimated concentrations of the NOx and the ammonia described above, respectively.

The present diagnosis device diagnoses that a malfunction occurs in the SCR catalyst 53c when the actual sensor section current IS of the downstream NOx concentration sensor 77 becomes equal to or larger than the estimated sensor section current IS_S.

<Estimation of Sensor Current>

The estimation (i.e., the acquisition) of the estimated sensor section current IS_S will be described.

The present diagnosis device estimates concentrations of the nitrogen monoxide, the nitrogen dioxide and the ammonia, which flow out from the SCR catalyst 53c when the NOx purification rate RNOX of the SCR catalyst 53c decreases to the predetermined purification rate, on the basis of the NOx concentration of the exhaust gas flowing into the SCR catalyst 53c (i.e., the inflow NOx concentration RNOXin) and an amount of the aqueous urea added to the exhaust gas flowing into the SCR catalyst 53c (that is, an amount of the ammonia supplied to the SCR catalyst 53c).

The present diagnosis device converts the estimated concentrations of the nitrogen monoxide, the nitrogen dioxide and the ammonia as described later to acquire the estimated sensor section current IS_S.

As described above, the sensor section current IS includes electric current generated depending on the nitrogen monoxide concentration of the exhaust gas reaching the downstream NOx concentration sensor 77.

Also as described above, the nitrogen dioxide included in the exhaust gas produces nitrogen monoxide at the pump electrode 94b through a chemical reaction of following formula (6). This nitrogen monoxide discharges oxygen at the sensor electrode 94e through a chemical reaction of following formula (7). Therefore, the sensor section current IS also includes electric current generated depending on the concentration of the nitrogen monoxide produced from nitrogen dioxide included in the exhaust gas at the pump electrode 94b.

$$2NO_2 \rightarrow 2NO+O_2 \quad (6)$$

$$2NO \rightarrow N_2+O_2 \quad (7)$$

As described above, the ammonia included in the exhaust gas produces nitrogen monoxide at the pump electrode 94b through a chemical reaction of following formula (8). This nitrogen monoxide discharges oxygen at the sensor electrode 94e through a chemical reaction of following formula (9). Therefore, the sensor section current IS also includes electric current generated depending on the concentration of the nitrogen monoxide produced from the ammonia included in the exhaust gas at the pump electrode 94b.

$$4NH_3+5O_2 \rightarrow 4NO+6H_2O \quad (8)$$

$$2NO \rightarrow N_2+O_2 \quad (9)$$

Therefore, even when the nitrogen dioxide and ammonia concentrations of the exhaust gas reaching the downstream NOx concentration sensor 77 are constant, respectively, if the nitrogen dioxide and ammonia concentrations of the exhaust gas reaching the pump electrode 94b changes, the sensor section current IS changes.

<Nitrogen Dioxide Influence Correction>

In this regard, the inventors of this application have realized that a part of the nitrogen dioxide included in the exhaust gas is converted to nitrogen monoxide through a chemical reaction of following formula (10) while the exhaust gas reaching the downstream NOx concentration sensor 77 passes through the protection layer 99. Therefore, the sensor section current IS increases depending on an amount of the nitrogen monoxide converted from the nitrogen dioxide in the protection layer 99.

$$2NO_2 \rightarrow 2NO+O_2 \quad (10)$$

The amount of the nitrogen monoxide converted from the nitrogen dioxide changes depending on following parameters (1) to (5).

(1) An oxygen concentration COX of the exhaust gas reaching the downstream NOx concentration sensor 77.

(2) A flow rate SV of the exhaust gas reaching the downstream NOx concentration sensor 77.

(3) A thickness AT of the protection layer 99 in a direction of passage of nitrogen dioxide through the protection layer 99.

(4) A temperature TH of the protection layer 99.

(5) A temperature TEX of the exhaust gas reaching the downstream NOx concentration sensor 77.

An amount of the nitrogen monoxide reaching the sensor electrode 94e among the nitrogen monoxide converted from the nitrogen dioxide changes depending on amounts of the hydrocarbon and the carbon monoxide included in the exhaust gas flowing into the downstream NOx concentration sensor 77.

In particular, when the oxygen concentration COX of the exhaust gas reaching the downstream NOx concentration sensor 77 is high, the chemical reaction of the formula (10) is unlikely to proceed, that is, a reaction speed is small. Therefore, as the oxygen concentration COX increases, an amount of the nitrogen monoxide converted from the nitrogen dioxide decreases and as a result, the sensor section current IS decreases. Thus, the oxygen concentration COX is a parameter which changes a reaction speed of production of components (in this embodiment, nitrogen monoxide) from the nitrogen dioxide. Hereinafter, the oxygen concentration COX of the exhaust gas reaching the downstream NOx concentration sensor 77 will be simply referred to as "the oxygen concentration COX of the exhaust gas".

As the flow rate SV of the exhaust gas reaching the downstream NOx concentration sensor 77 increases, a time taken for the nitrogen dioxide to pass through the protection layer 99, that is, a time of the nitrogen dioxide to stay in the protection layer 99 decreases. Therefore, an amount of the nitrogen monoxide produced through the chemical reaction of the formula (10) decreases. Thus, as the flow rate SV of the exhaust gas increases, an amount of the nitrogen monoxide converted from the nitrogen dioxide decreases and as a result, the sensor section current IS decreases. Therefore, the flow rate SV of the exhaust gas is a parameter which changes a time of the nitrogen dioxide to stay in the protection layer 99. Hereinafter, the flow rate SV of the exhaust gas reaching the downstream NOx concentration sensor 77 will be also referred to as "the exhaust gas flow rate SV".

When the thickness AT of the protection layer 99 in the direction of the passage of the nitrogen dioxide through the protection layer 99 increases, a time taken for the nitrogen dioxide to pass through the protection layer 99 increases. Therefore, an amount of the nitrogen monoxide produced through the chemical reaction of the formula (10) increases. Therefore, as the thickness AT of the protection layer 99 increases, the amount of the nitrogen monoxide converted from the nitrogen dioxide increases and as a result, the sensor section current IS increases. Thus, the thickness AT of the protection layer 99 is a parameter which changes a time of the nitrogen dioxide to stay in the protection layer 99. Hereinafter, the thickness AT of the protection layer 99 in the direction of the passage of the nitrogen dioxide through the protection layer 99 will be also referred to as "the protection layer thickness AT".

When the temperature TH of the protection layer 99 is high, the chemical reaction of the formula (10) is likely to proceed, that is, the reaction speed is large. Therefore, as the temperature TH of the protection layer 99 increases, an amount of the nitrogen monoxide converted from the nitrogen dioxide increases and as a result, the sensor section current IS increases. Thus, the temperature TH of the protection layer 99 is a parameter which changes a reaction speed of production of component (in this embodiment, the nitrogen monoxide) from the nitrogen dioxide. Hereinafter, the temperature TH of the protection layer 99 will be also referred to as "the protection layer temperature TH".

When the temperature TEX of the exhaust gas reaching the downstream NOx concentration sensor 77 is high, the chemical reaction of the formula (10) is likely to proceed, that is, the reaction speed is large. Therefore, as the temperature TEX of the exhaust gas increases, an amount of nitrogen monoxide converted from the nitrogen dioxide increases and as a result, the sensor section current IS increases. Thus, the temperature TEX of the exhaust gas is a parameter which changes a reaction speed of production of component (in this embodiment, nitrogen monoxide) from the nitrogen dioxide. Hereinafter, the temperature TEX of the exhaust gas reaching the downstream NOx concentration sensor 77 will be also referred to as "the exhaust gas temperature TEX".

When the downstream NOx concentration sensor 77 does not include an atmospheric air introduction hole, exhaust gas including hydrocarbon and carbon monoxide flows into the downstream NOx concentration sensor 77. These hydrocarbon and carbon monoxide reduces nitrogen monoxide produced from nitrogen dioxide. In other words, nitrogen monoxide produced from nitrogen dioxide is consumed for oxidizing the hydrocarbon and the carbon monoxide.

Amounts of hydrocarbon and carbon monoxide flowing into the downstream NOx concentration sensor 77 increase, respectively as the exhaust gas flow rate SV increases. Therefore, when the downstream NOx concentration sensor 77 does not have an atmospheric air introduction hole, an amount of nitrogen monoxide consumed for oxidizing hydrocarbon and carbon monoxide among nitrogen monoxide produced from nitrogen dioxide increases. Thus, an amount of nitrogen monoxide reaching the sensor electrode 94e decreases and as a result, the sensor section current IS decreases.

Accordingly, in this embodiment, a coefficient KNO2 for converting the nitrogen dioxide concentration CNO2 of the exhaust gas, which flows out from the SCR catalyst 53c when following conditions (1) to (5) are satisfied, to a sensor section current IS is previously acquired by an experiment or the like and is stored in the ROM of the ECU 80 as a nitrogen dioxide conversion coefficient KNO2.

(1) The oxygen concentration COX of the exhaust gas corresponds to a base oxygen concentration.
(2) The exhaust gas flow rate SV corresponds to a base flow rate.
(3) The protection layer thickness AT is a base thickness.
(4) The protection layer temperature TH corresponds to a base protection layer temperature.
(5) The exhaust gas temperature TEX corresponds to a base exhaust gas temperature.

Then, the present diagnosis device estimates, as an estimated nitrogen dioxide concentration CNO2_S, a concentration of nitrogen dioxide flowing out from the SCR catalyst 53c when the NOx purification rate RNOX of the SCR catalyst 53c decreases to the predetermined purification rate. Further, the present diagnosis device multiplies the nitrogen dioxide concentration CNO2_S by the nitrogen dioxide conversion coefficient KNO2 to acquire or estimate a base sensor section current IS_Nb (IS_Nb=CNO2_S×KNO2).

Further, in this embodiment, a coefficient KOX_N for correcting the base sensor section current IS_Nb to compensate a change of an amount of nitrogen monoxide produced from nitrogen dioxide due to a change of the oxygen concentration COX of the exhaust gas is previously acquired by an experiment or the like and is stored in the ROM of the ECU 80 as an oxygen-related correction coefficient KOX_N.

Figure 5A:
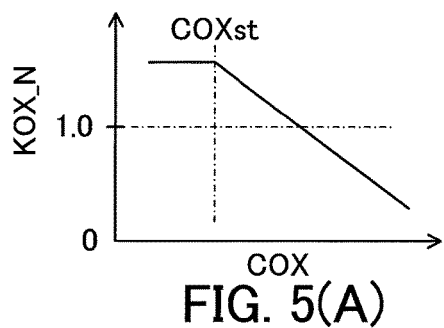
FIG. 5(A) shows a relationship between oxygen concentration of exhaust gas and an oxygen-related correction coefficient.

As shown in FIG. 5(A), the oxygen-related correction coefficient KOX_N decreases as the oxygen concentration COX of the exhaust gas increases when the oxygen concentration COX of the exhaust gas is equal to or larger than a predetermined oxygen concentration COXst, that is, when the air-fuel ratio of the exhaust gas is equal to or leaner than the stoichiometric air-fuel ratio. In this case, the oxygen-related correction coefficient KOX_N is within a range from a positive value smaller than "1" to a value larger than "1".

The oxygen-related correction coefficient KOX_N is constant independently of the oxygen concentration COX of the exhaust gas when the oxygen concentration COX of the exhaust gas is smaller than the predetermined oxygen concentration COXst, that is, when the air-fuel ratio of the exhaust gas is richer than the stoichiometric air-fuel ratio. In this case, the oxygen-related correction coefficient KOX_N is the largest value larger than "1".

When the air-fuel ratio of the exhaust gas is richer than the stoichiometric air-fuel ratio, the oxygen concentration of the exhaust gas is extremely small (in particular, generally zero) and thus, the chemical reaction of the formula (10) does not proceed. This is because the oxygen-related correction coefficient KOX_N is a constant value when the air-fuel ratio of the exhaust gas is richer than the stoichiometric air-fuel ratio.

It should be noted that the oxygen-related correction coefficient KOX_N is "1" when the oxygen concentration COX of the exhaust gas corresponds to the base oxygen concentration.

Further, a coefficient KSV_N for correcting the base sensor section current IS_Nb to compensate a change of an amount of nitrogen monoxide produced from nitrogen dioxide due to a change of the exhaust gas flow rate SV is previously acquired by an experiment or the like and is stored in the ROM of the ECU 80 as an exhaust-gas-flow-rate-related correction coefficient KSV_N.

Figure 5D:
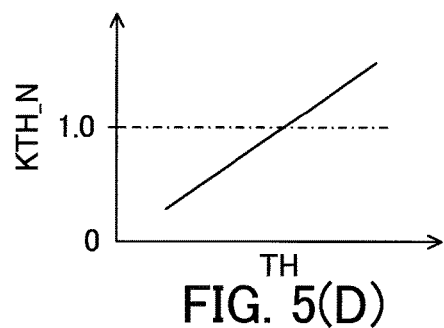
FIG. 5(D) shows a relationship between a protection layer temperature and a protection-layer-temperature-related correction coefficient.
Figure 5B:
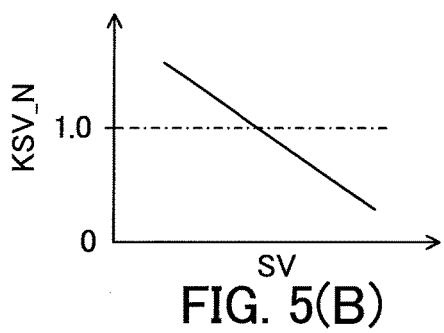
FIG. 5(B) shows a relationship between exhaust gas flow rate and a flow-rate-related correction coefficient.

As shown in FIG. 5(B), the exhaust-gas-flow-rate-related correction coefficient KSV_N decreases as the exhaust gas flow rate SV increases. The exhaust-gas-flow-rate-related correction coefficient KSV_N is within a range from a positive value smaller than "1" to a value larger than "1". It should be noted that the exhaust-gas-flow-rate-related correction coefficient KSV_N is "1" when the exhaust gas flow rate SV corresponds to the base flow rate.

Further, a coefficient KAT_N for connecting the base sensor section current IS_Nb to compensate a variation of an amount of nitrogen monoxide produced from nitrogen dioxide due to a variation of the protection layer thickness AT is previously acquired by an experiment or the like and is stored in the ROM of the ECU 80 as a thickness-related correction coefficient KAT_N.

Figure 5E:
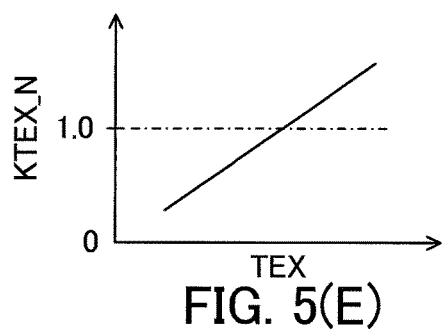
FIG. 5(E) shows a relationship between an exhaust gas temperature and an exhaust-gas-temperature-related correction coefficient.
Figure 5C:
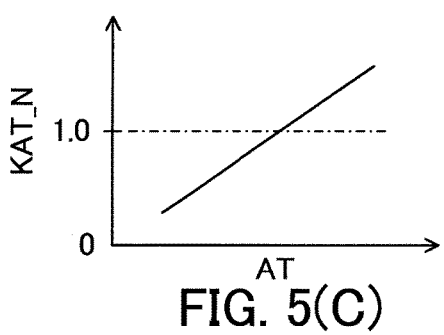
FIG. 5(C) shows a relationship between a protection layer thickness and a thickness-related correction coefficient.

As shown in FIG. 5(C), the thickness-related correction coefficient KAT_N increases as the protection layer thickness AT increases. The thickness-related correction coefficient KAT_N is within a range from a positive value smaller than "1" to a value larger than "1". It should be noted that the thickness-related correction coefficient KAT_N is "1" when the protection layer thickness AT corresponds to the base thickness.

Further, a coefficient KTH_N for correcting the base sensor section current IS_Nb to compensate a change of an amount of nitrogen monoxide produced from nitrogen dioxide due to a change of the protection layer temperature TH is previously acquired by an experiment or the like and is stored in the ROM of the ECU 80 as a protection-layer-temperature-related correction coefficient KTH_N.

As shown in FIG. 5(D), the protection-layer-temperature-related correction coefficient KTH_N increases as the protection layer temperature TH increases. The protection-layer-temperature-related correction coefficient KTH_N is within a range from a positive value smaller than "1" to a value larger than "1". It should be noted that the protection-layer-temperature-related correction coefficient KTH_N is "1" when the protection layer temperature TH corresponds to the base protection layer temperature.

Further, a coefficient KTEX_N for correcting the base sensor section current IS_Nb to compensate a change of an amount of nitrogen monoxide produced from nitrogen dioxide duel to a change of the exhaust gas temperature TEX is previously acquired by an experiment or the like and is stored in the ROM of the ECU 80 as an exhaust-gas-temperature-related correction coefficient KTEX_N.

As shown in FIG. 5(E), the exhaust-gas-temperature-related correction coefficient KTEX_N increases as the exhaust gas temperature TEX increases. The exhaust-gas-temperature-related correction coefficient KTEX_N is within a range from a positive value smaller than "1" to a value larger than "1". It should be noted that the exhaust-gas-temperature-related correction coefficient KTEX_N is "1" when the exhaust gas temperature TEX corresponds to the base exhaust gas temperature.

Further, a coefficient KTK_N for correcting the base sensor section current IS_Nb to compensate a change of an amount of nitrogen monoxide reaching the sensor electrode 94e due to a change of the exhaust gas flow rate SV, that is, due to changes of amounts of hydrocarbon and carbon monoxide flowing into the downstream NOx concentration sensor 77 is previously acquired by an experiment or the like and is stored in the ROM of the ECU 80 as a consumption-related correction coefficient KTK_N.

Figure 5F:
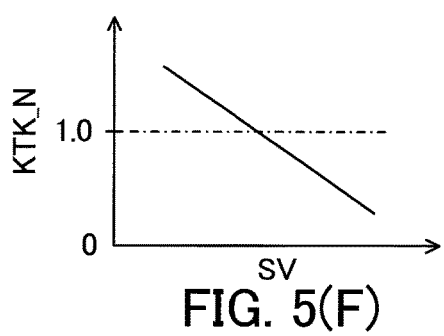
FIG. 5(F) shows a relationship between an exhaust gas flow rate and a consumption-related correction coefficient.

As shown in FIG. 5(F), the consumption-related correction coefficient KTK_N decreases as the exhaust gas flow rate SV increases. The consumption-related correction coefficient KTK_N is within a range from a positive value smaller than "1" to a value larger than "1". It should be noted that the consumption-related correction coefficient KTK_N is "1" when the exhaust gas flow rate SV corresponds to the base flow rate.

The present diagnosis device acquires the oxygen-related correction coefficient KOX_N on the basis of the oxygen concentration COX of the exhaust gas, acquires the exhaust-gas-flow-rate-related correction coefficient KSV_N on the basis of the exhaust gas flow rate SV, acquires the thickness-related correction coefficient KAT_N on the basis of the protection layer thickness AT, acquires the protection-layer-temperature-related correction coefficient KTH_N on the basis of the protection layer temperature TH, acquires the exhaust-gas-temperature-related correction coefficient KTEX_N on the basis of the exhaust gas temperature TEX and acquires the consumption-related correction coefficient KTK_N on the basis of the exhaust gas flow rate SV.

The present diagnosis device multiplies the base sensor section current IS_Nb by the acquired correction coefficients KOX_N, KSV_N, KAT_N, KTH_N, KTEX_N and KTK_N. Thereby, the present diagnosis device estimates, as an estimated sensor section current IS_N, the sensor section current IS which the downstream NOx concentration sensor 77 outputs depending on the nitrogen dioxide concentration of the exhaust gas when the NOx purification rate RNOX of the SCR catalyst 53c decreases to the predetermined purification rate (IS_N=IS_Nb×KOX_N×KSV_N×KAT_N×KTH_N×KTEX_N×KTK_N).

<Ammonia Influence Correction>

The inventors of this application have realized that a part of ammonia included in the exhaust gas is converted to nitrogen through a chemical reaction of following formula (11) when the exhaust gas passes through the protection layer 99. Therefore, the sensor section current IS decreases by an amount of ammonia converted to nitrogen in the protection layer 99.

$$4NH_3 + 3O_2 \rightarrow 2N_2 + 6H_2O \qquad (11)$$

An amount of ammonia converted to the nitrogen changes depending on following parameters (1) to (6).
(1) The oxygen concentration COX of the exhaust gas.
(2) A water concentration CSB of the exhaust gas reaching the downstream NOx concentration sensor 77.
(3) The exhaust gas flow rate SV.
(4) The protection layer thickness AT.
(5) The protection layer temperature TH.
(6) The exhaust gas temperature TEX.

An amount of nitrogen monoxide reaching the sensor electrode 94e among nitrogen monoxide converted from ammonia changes depending on amounts of hydrocarbon and carbon monoxide flowing into the downstream NOx concentration sensor 77.

In particular, when the oxygen concentration COX of the exhaust gas is high, the chemical reaction of the formula (11) is likely to proceed, that is, the reaction speed is large. Therefore, as the oxygen concentration COX of the exhaust gas increases, an amount of ammonia converted to the nitrogen increases and as a result, an amount of ammonia reaching the pump electrode 94b decreases. Thus, an amount of nitrogen monoxide produced from ammonia at the pump electrode 94b decreases. Therefore, an amount of nitrogen monoxide reaching the sensor electrode 94e decreases and as a result, the sensor section current IS decreases. Thus, the oxygen concentration COX of the exhaust gas is a parameter which changes a reaction speed for producing component (in this embodiment, nitrogen) from ammonia.

Further, when the water concentration CSB of the exhaust gas is high, the chemical reaction of the formula (11) is unlikely to proceed, that is, the reaction speed is small. Therefore, as the water concentration CSB of the exhaust gas increases, an amount of ammonia converted to nitrogen decreases and as a result, an amount of ammonia reaching the pump electrode 94b increases. Thus, an amount of nitrogen monoxide produced from ammonia at the pump electrode 94b increases. Therefore, an amount of nitrogen monoxide reaching the sensor electrode 94e increases and as a result, the sensor section current IS increases. Thus, the water concentration CSB of the exhaust gas is a parameter which changes a reaction speed of production of component (in this embodiment, nitrogen) from ammonia.

Further, when the exhaust gas flow rate SV is large, a time taken for ammonia to pass through the protection layer 99, that is, a time of ammonia to stay in the protection layer 99 is short. Therefore, an amount of ammonia converted to nitrogen through the chemical reaction of the formula (11) is small.

Therefore, as the exhaust gas flow rate SV increases, an amount of ammonia converted to nitrogen decreases and as a result, an amount of ammonia reaching the pump electrode 94b increases. Thus, an amount of nitrogen monoxide reaching the sensor electrode 94e increases and as a result, the sensor section current IS increases. Thus, the exhaust gas flow rate SV is a parameter which changes a time of ammonia to stay in the protection layer 99.

Further, when the protection layer thickness AT is large, a time taken for ammonia to pass through the protection layer 99 is long. Therefore, an amount of ammonia converted to nitrogen through the chemical reaction of the formula (11) is large. Thus, as the protection layer thickness AT increases, an amount of ammonia converted to nitrogen increases and as a result, an amount of ammonia reaching the pump electrode 94b decreases. Therefore, an amount of nitrogen monoxide reaching the sensor electrode 94e decreases and as a result, the sensor section current IS decreases. Thus, the protection layer thickness AT is a parameter which changes a time of ammonia to stay in the protection layer 99.

Further, when the protection layer temperature TH is high, the chemical reaction of the formula (11) is likely to proceed, that is, the reaction speed is large. Thus, as the protection layer temperature TH increases, an amount of ammonia converted to nitrogen increases and as a result, an amount of ammonia reaching the pump electrode 94b decreases. Therefore, an amount of nitrogen monoxide reaching the sensor electrode 94e decreases and as a result, the sensor section current IS decreases. Thus, the protection layer temperature TH is a parameter which changes a reaction speed of production of component (in this embodiment, nitrogen) from ammonia.

Further, when the exhaust gas temperature TEX is high, the reaction of the formula (11) is likely to proceed, that is, the reaction speed is large. Therefore, as the exhaust gas temperature TEX increases, an amount of ammonia converted to nitrogen increases and as a result, the sensor section current IS decreases. Thus, the exhaust gas temperature TEX is a parameter which changes a reaction speed of production of component (in this embodiment, nitrogen) from ammonia.

Further, as described above, when the downstream NOx concentration sensor 77 does not have an atmospheric air introduction hole, the exhaust gas including hydrocarbon and carbon monoxide flows into the downstream NOx concentration sensor 77. These hydrocarbon and carbon monoxide reduce nitrogen monoxide produced from ammonia. In other words, nitrogen monoxide produced from ammonia is consumed for oxidizing hydrocarbon and carbon monoxide.

Further, amounts of hydrocarbon and carbon monoxide flowing into the downstream NOx concentration sensor 77 increase, respectively as the exhaust gas flow rate SV increases. Therefore, when the downstream NOx concentration sensor 77 does not have an atmospheric air introduction hole, as the exhaust gas flow rate SV increases, an amount of nitrogen monoxide consumed for oxidizing hydrocarbon and carbon monoxide among nitrogen monoxide produced from ammonia increases. Thus, an amount of nitrogen monoxide reaching the sensor electrode 94e decreases and as a result, the sensor section current IS decreases.

Accordingly, in this embodiment, a coefficient NH3 for converting the ammonia concentration CNH3 of the exhaust gas, which flows out from the SCR catalyst 53c when following conditions (1) to (6) are satisfied, to the sensor section current IS is previously acquired by an experiment or the like and is stored in the ROM of the ECU 80 as an ammonia conversion coefficient KNH3.

(1) The oxygen concentration COX of the exhaust gas corresponds to the base oxygen concentration.

(2) The water concentration CSB of the exhaust gas corresponds to a base water concentration.

(3) The exhaust gas flow rate SV corresponds to the base flow rate.

(4) The protection layer thickness AT is the base thickness.

(5) The protection layer temperature TH corresponds to the base protection layer temperature.

(6) The exhaust gas temperature TEX corresponds to the base exhaust gas temperature.

Then, the present diagnosis device estimates, as an estimated ammonia concentration CNH3_S, a concentration of ammonia which flows out from the SCR catalyst 53c when the NOx purification rate RNOX of the SCR catalyst 53c decreases to the predetermined purification rate. Then, the present diagnosis device multiplies the estimated ammonia concentration CNH3_S by the ammonia conversion coefficient KNH3 to acquire or estimate a base sensor section current IS_Ab (IS_Ab=CNH3_S×KNH3).

Further, a coefficient KOX_A for correcting the base sensor section current IS_Ab to compensate a change of an amount of ammonia converted to nitrogen due to a change of the oxygen concentration COX of the exhaust gas is previously acquired by an experiment or the like and is stored in the ROM of the ECU 80 as an oxygen-related correction coefficient KOX_A.

Figure 6A:
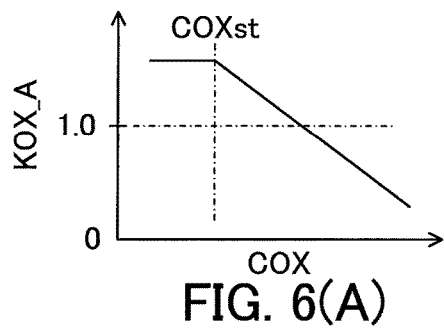
FIG. 6(A) shows a relationship between an oxygen concentration of exhaust gas and an oxygen-related correction coefficient.

As shown in FIG. 6(A), the oxygen-related correction coefficient KOX_A decreases as the oxygen concentration COX of the exhaust gas increases when the oxygen concentration COX of the exhaust gas is equal to or higher than a predetermined oxygen concentration COXst, that is, when the air-fuel ratio of the exhaust gas is equal to or leaner than the stoichiometric air-fuel ratio. The oxygen-related correction coefficient KOX_A is within a range from a positive value smaller than "1" to a value larger than "1".

When the air-fuel ratio of the exhaust gas is richer than the stoichiometric air-fuel ratio, the oxygen concentration COX of the exhaust gas is extremely small, in particular, generally zero and thus, the reaction of the formula (11) does not proceed. This is because the oxygen-related correction coefficient KOX_A is constant when the air-fuel ratio of the exhaust gas is richer than the stoichiometric air-fuel ratio.

On the other hand, the oxygen-related correction coefficient KOX_A is constant independently of the oxygen concentration COX of the exhaust gas when the oxygen concentration COX of the exhaust gas is smaller than the predetermined oxygen concentration COXst, that is, when the air-fuel ratio of the exhaust gas is richer than the stoichiometric air-fuel ratio. In this case, the oxygen-related correction coefficient KOX_A is the largest value larger than "1".

It should be noted that the oxygen-related correction coefficient KOX_A is "1" when the oxygen concentration COX of the exhaust gas corresponds to the base oxygen concentration.

Further, a coefficient KSB_A for correcting the base sensor section current IS_Ab to compensate a change of an amount of ammonia converted to nitrogen due to a change of the water concentration CSB of the exhaust gas is previously acquired by an experiment or the like and is stored in the ROM of the ECU 80 as a water-related correction coefficient KSB_A.

Figure 6E:
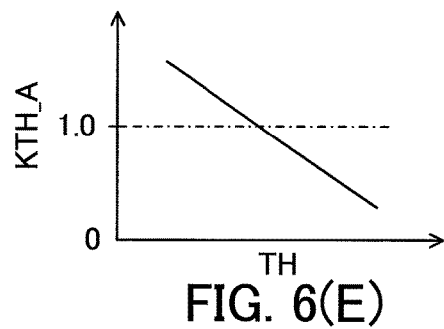
FIG. 6(E) shows a relationship between a protection layer temperature and a protection-layer-temperature-related correction coefficient.
Figure 6B:
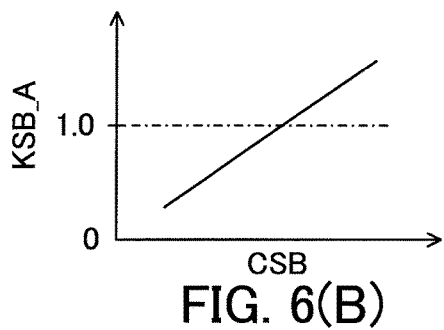
FIG. 6(B) shows a relationship between a water concentration of exhaust gas and a water-related correction coefficient.

As shown in FIG. 6(B), the water-related correction coefficient KSB_A increases as the water concentration CSB of the exhaust gas increases. The water-related correction coefficient KSB_A is within a range from a positive value smaller than "1" to a value larger than "1". It should be noted that the water-related correction coefficient KSB_A is "1" when the water concentration CSB of the exhaust gas corresponds to the base water concentration.

Further, a coefficient KSV_A for correcting the base sensor section current IS_Ab to compensate a change of an amount of ammonia converted to nitrogen due to a change of the exhaust gas flow rate SV is previously acquired by an experiment or the like and is stored in the ROM of the ECU 80 as an exhaust-gas-flow-rate-related correction coefficient KSV_A.

Figure 6F:
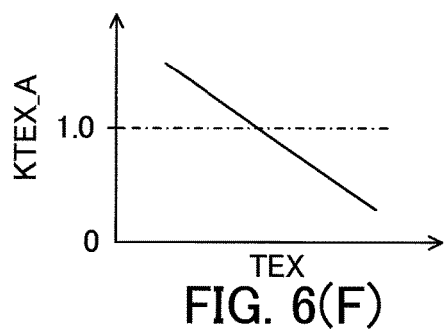
FIG. 6(F) shows a relationship between an exhaust gas temperature and an exhaust-gas-temperature-related correction coefficient.
Figure 6C:
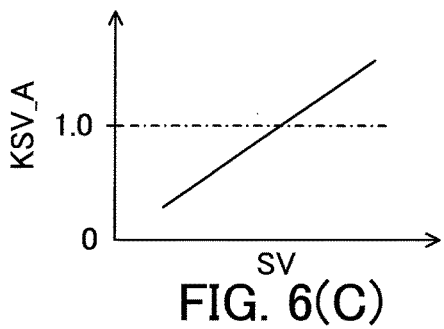
FIG. 6(C) shows a relationship between an exhaust gas flow rate and a flow-rate-related correction coefficient.

As show in FIG. 6(C), the exhaust-gas-flow-rate-related correction coefficient KSV_A increases as the exhaust gas flow rate SV increases. The exhaust-gas-flow-rate-related correction coefficient KSV_A is within a range from a positive value smaller than "1" to a value larger than "1". It should be noted that the exhaust-gas-flow-rate-related correction coefficient KSV_A is "1" when the exhaust gas flow rate SV corresponds to the base flow rate.

Further, a coefficient KAT_A for correcting the base sensor section current IS_Ab to compensate a variation of an amount of ammonia converted to nitrogen due to a variation of the protection layer thickness AT is previously acquired by an experiment or the like and is stored in the ROM of the ECU 80 as a thickness-related correction coefficient KAT_A.

Figure 6G:
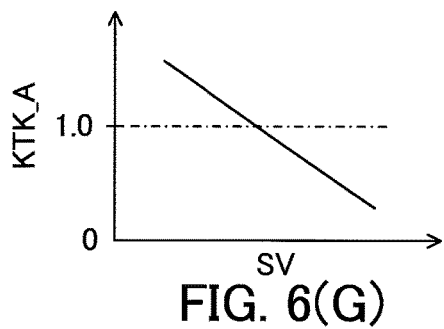
FIG. 6(G) shows a relationship between an exhaust gas flow rate and a consumption-related correction coefficient.
Figure 6D:
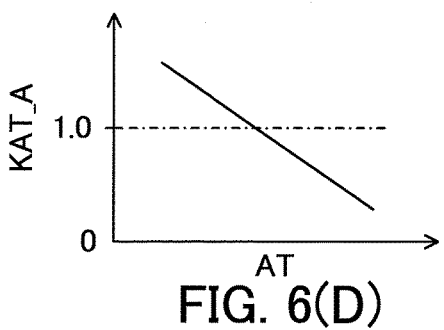
FIG. 6(D) shows a relationship between a protection layer thickness and a thickness-related correction coefficient.

As shown in FIG. 6(D), the thickness-related correction coefficient KAT_A decreases as the protection layer thickness AT increases. The thickness-related correction coefficient KAT_A is within a range from a positive value smaller than "1" to a value larger than "1". It should be noted that the thickness-related correction coefficient KAT_A is "1" when the protection layer thickness AT corresponds to the base thickness.

Further, a coefficient KTH_A for correcting the base sensor section current IS_Ab to compensate a change of an amount of ammonia converted to nitrogen due to a change of the protection layer temperature TH is previously acquired by an experiment or the like and is stored in the ROM of the ECU 80 as a protection-layer-temperature-related correction coefficient KTH_A.

As shown in FIG. 6(E), the protection-layer-temperature-related correction coefficient KTH_A decreases as the protection layer temperature TH increases. The protection-layer-temperature-related correction coefficient KTH_A is within a range from a positive value smaller than "1" to a value larger than "1". It should be noted that the protection-layer-temperature-related correction coefficient KTH_A is "1" when the protection layer temperature TH corresponds to the base protection layer temperature.

Further, a coefficient KTEX_A for correcting the base sensor section current IS_Ab to compensate a change of an amount of ammonia converted to nitrogen due to a change of the exhaust gas temperature TEX is previously acquired by an experiment or the like and is stored in the ROM of the ECU 80 as an exhaust-gas-temperature-related correction coefficient KTEX_A.

As shown in FIG. 6(F), the exhaust-gas-temperature-related correction coefficient KTEX_A decreases as the exhaust gas temperature TEX increases. The exhaust-gas-temperature-related correction coefficient KTEX_A is within a range from a positive value smaller than "1" to a value larger than "1". It should be noted that the exhaust-gas-temperature-related correction coefficient KTEX_A is "1" when the exhaust gas temperature TEX corresponds to the base exhaust gas temperature.

Further, a coefficient KTK_A for correcting the base sensor section current IS_Ab to compensate a change of an amount of nitrogen monoxide reaching the sensor electrode 94e due to a change of the exhaust gas flow rate SV, that is, due to changes of amounts of hydrocarbon and carbon monoxide flowing into the downstream NOx concentration sensor 77 is previously acquired by an experiment or the like and is stored in the ROM of the ECU 80 as a consumption-related correction coefficient KTK_A.

As shown in FIG. 6(G), the consumption-related correction coefficient KTK_A decreases as the exhaust gas flow rate SV increases. The consumption-related correction coefficient KTK_A is within a range from a positive value smaller than "1" to a value larger than "1". It should be noted that the consumption-related correction coefficient KTK_A is "1" when the exhaust gas flow rate SV corresponds to the base flow rate.

The present diagnosis device acquires the oxygen-related correction coefficient KOX_A on the basis of the oxygen concentration COX of the exhaust gas, acquires the water-related correction coefficient KSB_A on the basis of the water concentration CSB of the exhaust gas, acquires the exhaust-gas-flow-rate-related correction coefficient KSV_A on the basis of the exhaust gas flow rate SV, acquires the thickness-related correction coefficient KAT_A on the basis of the protection layer thickness AT, acquires the protection-layer-temperature-related correction coefficient KTH_A on the basis of the protection layer temperature TH, acquires the exhaust-gas-temperature-related correction coefficient KTEX_A on the basis of the exhaust gas temperature TEX and acquires the consumption-related correction coefficient KTK_A on the basis of the exhaust gas flow rate SV.

Then, the present diagnosis device multiplies the base sensor section current IS_Ab by the acquired correction coefficients KOX_A, KSB_A, KSV_A, KAT_A, KTEX_A and KTK_A. Thereby, the present diagnosis device estimates, as an estimated sensor section current IS_A, a sensor section current IS which the downstream NOx concentration sensor 77 outputs depending on the ammonia concentration of the exhaust gas when the NOx purification rate RNOX of the SCR catalyst 53c decreases to the predetermined purification rate (IS_A=IS_Ab×KOX_A×KSB_A×KSV_A×KAT_A×KTH_A×KTEX_A×KTK_A).

Further, an amount of nitrogen monoxide reaching the sensor electrode 94e among nitrogen monoxide originally included in the exhaust gas reaching the downstream NOx concentration sensor 77 changes depending on amounts of hydrocarbon and carbon monoxide included in the exhaust gas flowing into the downstream NOx concentration sensor 77.

Accordingly, in this embodiment, a coefficient KNO for converting the nitrogen monoxide concentration CNO of the exhaust gas, which flows out from the SCR catalyst 53c, to a sensor section current IS is previously acquired by an experiment or the like and is stored in the ROM of the ECU 80 as a nitrogen monoxide conversion coefficient KNO.

As described above, the present diagnosis device estimates, as an estimated nitrogen monoxide concentration CNO_S, a concentration of nitrogen monoxide which flows out from the SCR catalyst 53$c$ when the NOx purification rate RNOX of the SCR catalyst 53$c$ decreases to the predetermined purification rate.

The present diagnosis device multiplies the estimated nitrogen monoxide concentration CNO_S by the nitrogen monoxide conversion coefficient KNO to acquire or estimate a base sensor section current IS_NOb (IS_NOb=CNO_S× KNO).

Further, a coefficient KTK_NO for correcting the base sensor section current IS_NOb to compensate a change of an amount of nitrogen monoxide reaching the sensor electrode 94$e$ due to a change of the exhaust gas flow rate SV, that is, due to changes of amounts of hydrocarbon and carbon monoxide flowing into the downstream NOx concentration sensor 77 is previously acquired by an experiment or the like and is stored in the ROM of the ECU 80 as a consumption-related correction coefficient KTK_NO.

Figure 7:
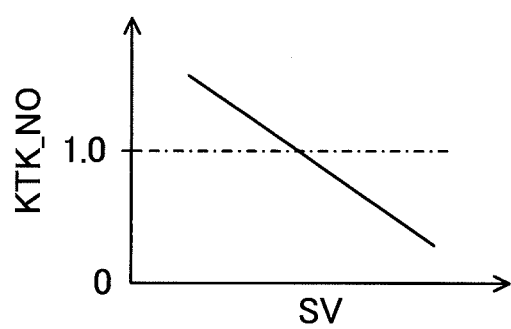
FIG. 7 shows a relationship between an exhaust gas flow rate and a consumption-related correction coefficient.

As shown in FIG. 7, the consumption-related correction coefficient KTK_NO decreases as the exhaust gas flow rate SV increases. The consumption-related correction coefficient KTK_NO is within a range from a positive value smaller than "1" to a value larger than "1". It should be noted that the consumption-related correction coefficient KTK_NO is "1" when the exhaust gas flow rate SV corresponds to the base flow rate.

The present diagnosis device acquires the consumption-related correction coefficient KTK_NO on the basis of the exhaust gas flow rate SV. Then, the present diagnosis device multiplies the base sensor section current IS_NOb by the acquired consumption-related correction coefficient KTK_NO. Thereby, the present diagnosis device estimates, as an estimated sensor section current IS_NO, a sensor section current IS which the downstream NOx concentration sensor 77 outputs depending on the nitrogen monoxide concentration when the NOx purification rate RNOX of the SCR catalyst 53$c$ decreases to the predetermined purification rate (IS_NO=IS_NOb×KTK_NO).

The present diagnosis device acquires a value obtained by adding the estimated sensor section currents IS_N and IS_A to the estimated sensor section current IS_NO as a sensor section current IS (hereinafter, will be referred to as "the estimated sensor section current IS_S") which is expected to be output from the downstream NOx concentration sensor 77 when the NOx purification rate RNOX of the SCR catalyst 53$c$ decreases to the predetermined purification rate (IS_S=IS_NO+IS_N+IS_A).

The present diagnosis device diagnoses that a malfunction occurs in the SCR catalyst 53$c$ when the sensor section current IS becomes equal to or larger than the estimated sensor section current IS_S.

The summary of the malfunction diagnosis of the SCR catalyst 53$c$ carried out by the present diagnosis device has been described. The present diagnosis device acquires, as the estimated sensor section current IS_S, the sensor section current IS which the downstream NOx concentration sensor 77 outputs when a malfunction occurs in the SCR catalyst 53$c$ in consideration of a change of an amount of nitrogen monoxide produced from nitrogen dioxide in the protection layer 99, a change of an amount of ammonia converted to nitrogen in the protection layer 99 and a change of an amount of nitrogen monoxide reaching the sensor electrode 94$e$. Thus, the present diagnosis device can acquire an accurate estimated sensor section current IS_S.

<Concrete Operation of Malfunction Diagnosis Device>

A concrete operation of the present diagnosis device will be described. The CPU of the ECU 80 of the present diagnosis device is configured or programmed to execute a correction coefficient acquisition routine shown by a flow-chart in FIG. 8 every an elapse of a predetermined time. Therefore, at a predetermined timing, the CPU of the ECU 80 starts a process from a step 800 and then, proceeds with the process to a step 805 to whether or not an acquisition condition is satisfied. The acquisition condition is satisfied when following conditions (1) to (3) are satisfied.

(1) A temperature of the engine 10 is equal to or higher than a predetermined temperature. In other words, a warming of the engine 10 is completed.

(2) The SCR catalyst 53$c$ is activated. In other words, a warming of the SCR catalyst 53$c$ is completed.

(3) The downstream NOx concentration sensor 77 is activated. In other words, a warming of the downstream NOx concentration sensor 77 is completed.

When the acquisition condition is not satisfied, the CPU determines "No" at the step 805 and then, proceeds with the process to a step 895 to terminate the execution of this routine once.

On the other hand, when the acquisition condition is satisfied, the CPU determines "Yes" at the step 805 and then, sequentially executes processes of steps 810 to 860. Then, the CPU proceeds with the process to the step 895 to terminate the execution of this routine once.

Step 810: The CPU executes an oxygen concentration acquisition routine shown by a flowchart in FIG. 9 to acquire the oxygen concentration COX of the exhaust gas reaching the downstream NOx concentration sensor 77.

Step 815: The CPU applies the oxygen concentration COX to lookup tables MapKOX_N(COX) and MapKOX_A (COX), respectively to acquire the oxygen-related correction coefficients KOX_N and KOX_A. According to the table MapKOX_N(COX), the oxygen-related correction coefficient KOX_N corresponding to the oxygen concentration COX is acquired in accordance with the relationship shown in FIG. 5(A). According to the table MapKOX_A (COX), the oxygen-related correction coefficient KOX_A corresponding to the oxygen concentration COX is acquired in accordance with the relationship shown in FIG. 6(A).

Figure 10:
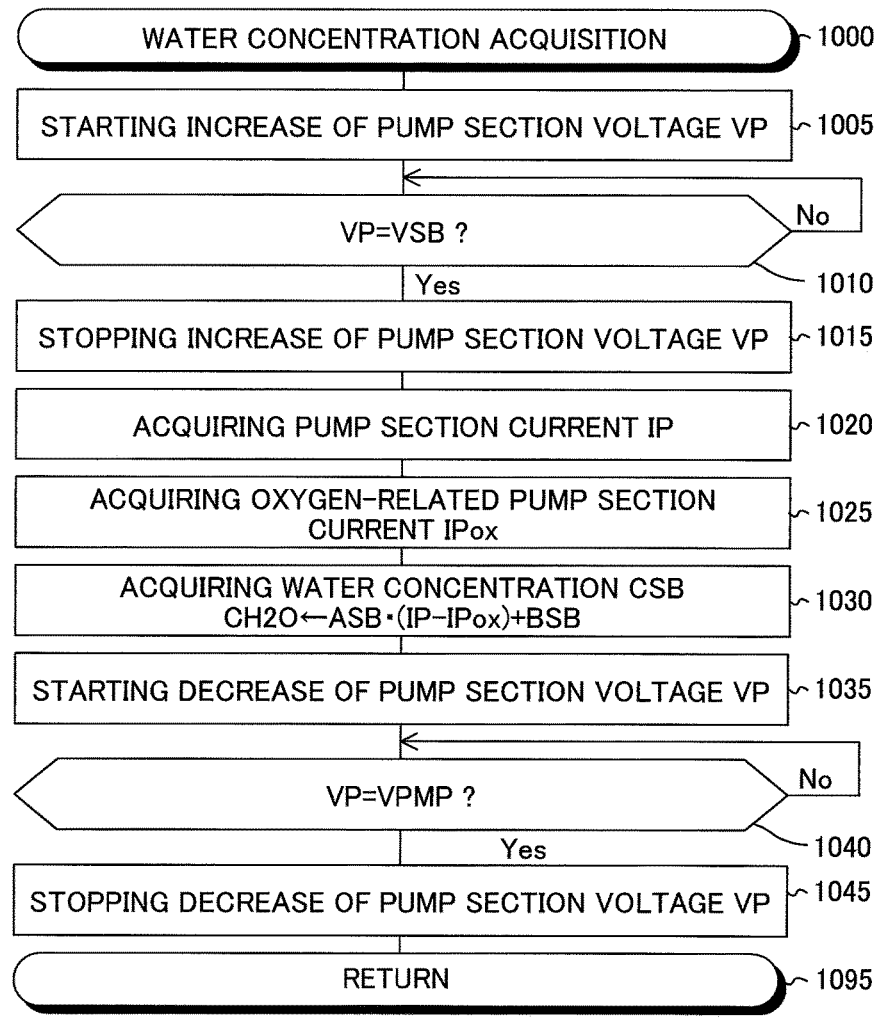
FIG. 10 shows a flowchart of a water concentration acquisition routine executed by the CPU shown in FIG. 1.

Step 820: The CPU executes a water concentration acquisition routine shown by a flowchart in FIG. 10 to acquire the water concentration CSB of the exhaust gas reaching the downstream NOx concentration sensor 77.

Step 825: The CPU applies the water concentration CSB to a lookup table MapKSB_A(CSB) to acquire the water-related correction coefficient KSB_A. According to the table MapKSB_A(CSB), the water-related correction coefficient KSB_A corresponding to the water concentration CSB is acquired in accordance with the relationship shown in FIG. 6(B).

Step 830: The CPU acquires the intake air amount Ga as the exhaust gas flow rate SV (i.e., a flow rate of the exhaust gas reaching the downstream NOx concentration sensor 77). The intake air amount Ga is acquired on the basis of a signal output from the air flow meter 71 separately by a process executed by the CPU and is stored in the backup RAM of the ECU 80.

Step 835: The CPU applies the exhaust gas flow rate SV to lookup tables MapKSV_N(SV) and MapKSV_A(SV), respectively to acquire the exhaust-gas-flow-rate-related correction coefficients KSV_N and KSV_A. According to the table MapKSV_N(SV), the exhaust-gas-flow-rate-related correction coefficient KSV_N corresponding to the exhaust gas flow rate SV is acquired in accordance with the relationship shown in FIG. 5(B). According to the table MapKSV_A(SV), the exhaust-gas-flow-rate-related correction coefficient KSV_A corresponding to the exhaust gas flow rate SV is acquired in accordance with the relationship shown in FIG. 6(C).

Step 840: The CPU applies the exhaust gas flow rate SV to lookup tables MapKTK_N(SV), MapKTK_A(SV) and MapKTK_NO(SV), respectively, to acquire the consumption-related correction coefficients KTK_N, KTK_A and KTK_NO.

According to the table MapKTK_N(SV), the consumption-related correction coefficient KTK_N corresponding to the exhaust gas flow rate SV is acquired in accordance with the relationship shown in FIG. 5(F). According to the table MapKTK_A(SV), the consumption-related correction coefficient KTK_A corresponding to the exhaust gas flow rate SV is acquired in accordance with the relationship shown in FIG. 6(G). According to the table MapKTK_NO(SV), the consumption-related correction coefficient KTK_NO corresponding to the exhaust gas flow rate SV is acquired in accordance with the relationship shown in FIG. 7.

Step 845: The CPU applies the protection layer thickness AT to lookup tables MapKAT_N(AT) and MapKAT_A(AT), respectively to acquire the thickness-related correction coefficients KAT_N and KAT_A. The protection layer thickness AT is previously stored in the ROM of the ECU 80.

According to the table MapKAT_N(AT), the thickness-related correction coefficient KAT_N corresponding to the protection layer thickness AT is acquired in accordance with the relationship shown in FIG. 5(C). According to the table MapKAT_A(AT), the thickness-related correction coefficient KAT_A corresponding to the protection layer thickness AT is acquired in accordance with the relationship shown in FIG. 6(D).

Step 850: The CPU executes a protection layer temperature acquisition routine shown by a flowchart in FIG. 11 to acquire the protection layer temperature TH.

Step 855: The CPU applies the protection layer temperature TH to lookup tables MapKTH_N(TH) and MapKTH_A(TH), respectively, to acquire the protection-layer-temperature-related correction coefficients KTH_N and KTH_A.

According to the table MapKTH_N(TH), the protection-layer-temperature-related correction coefficient KTH_N corresponding to the protection layer temperature TH is acquired in accordance with the relationship shown in FIG. 5(D). According to the table MapKTH_A(TH), the protection-layer-temperature-related correction coefficient KTH_A corresponding to the protection layer temperature TH is acquired in accordance with the relationship shown in FIG. 6(E).

Step 860: The CPU applies the exhaust gas temperature TEX to lookup tables MapKTEX_N(TEX) and MapKTEX_A(TEX), respectively to acquire the exhaust-gas-temperature-related correction coefficients KTEX_N and KTEX_A. The exhaust gas temperature TEX is acquired on the basis of a signal output from the temperature sensor 82 by a process executed separately by the CPU and is stored in the backup RAM of the ECU 80.

According to the table MapKTEX_N(TEX), the exhaust-gas-temperature-related correction coefficient KTEX_N corresponding to the exhaust gas temperature TEX is acquired in accordance with the relationship shown in FIG. 5(E). According to the table MapKTEX_A(TEX), the exhaust-gas-temperature-related correction coefficient KTEX_A corresponding to the exhaust gas temperature TEX is acquired in accordance with the relationship shown in FIG. 6(F).

The acquisition of the correction coefficients by the present diagnosis device has been described.

<Oxygen Concentration Acquisition>

An acquisition of the oxygen concentration of the exhaust gas carried out by the present diagnosis device will be described.

Figure 8:
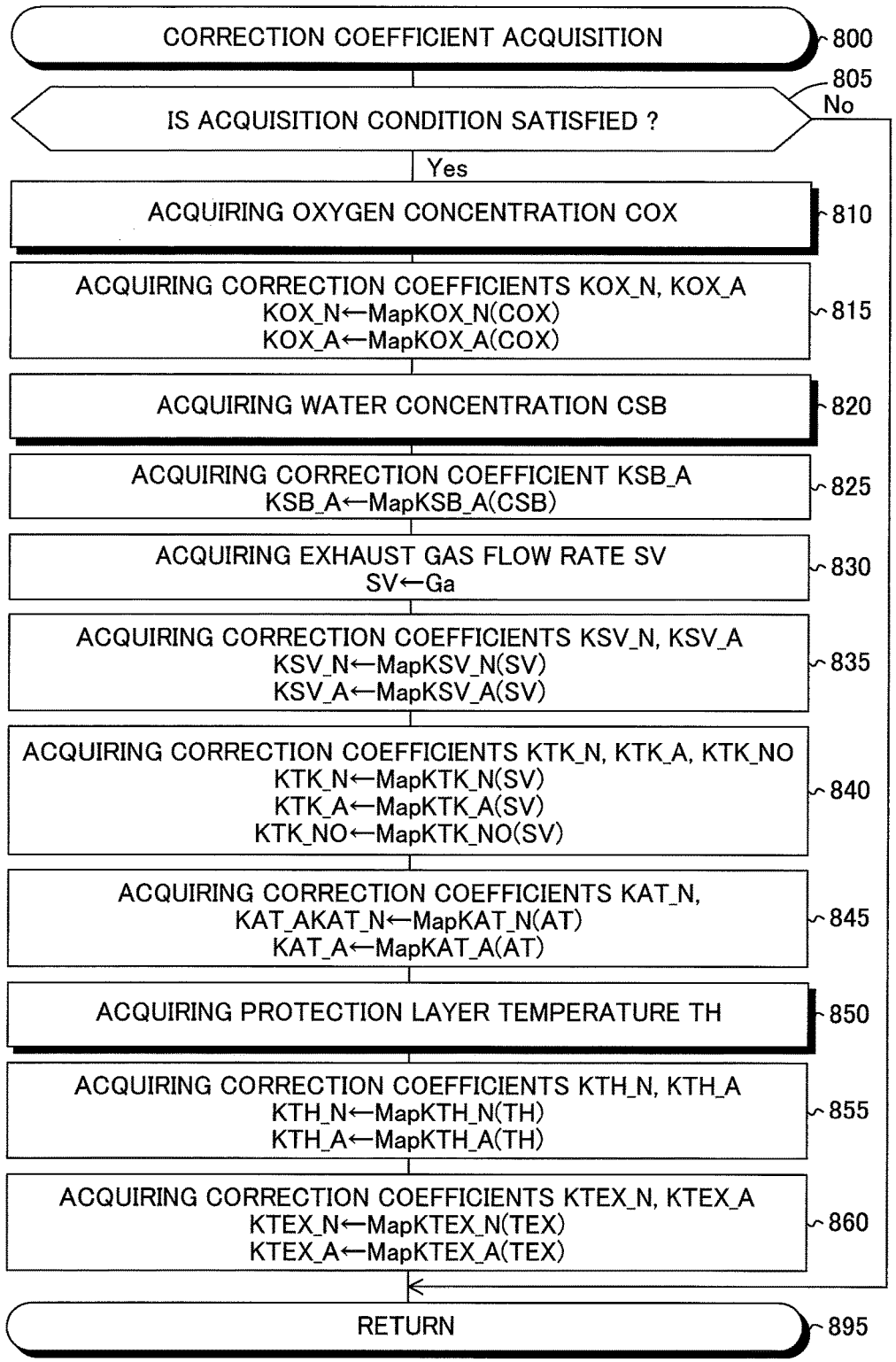
FIG. 8 shows a flowchart of a correction coefficient acquisition routine executed by a CPU shown in FIG. 1.
Figure 9:
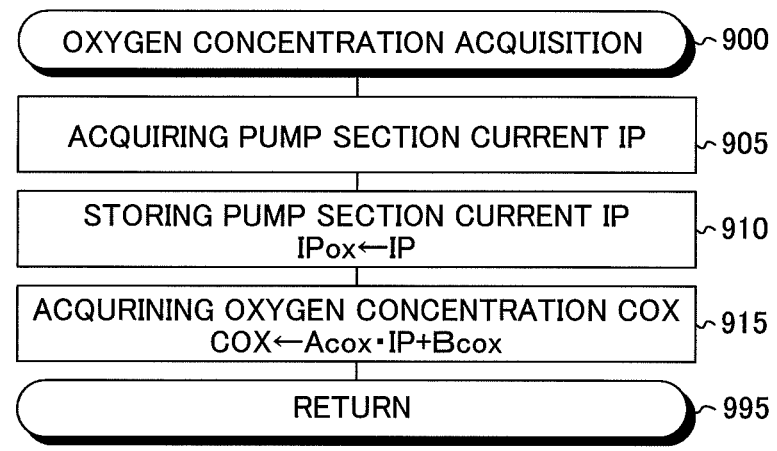
FIG. 9 shows a flowchart of an oxygen concentration acquisition routine executed by the CPU shown in FIG. 1.

As described above, when the CPU proceeds with the process to the step 810 of FIG. 8, the CPU is configured or programmed to execute the oxygen concentration acquisition routine shown by a flowchart in FIG. 9. Therefore, when the CPU proceeds with the process to the step 810 of FIG. 8, the CPU starts a process from a step 900 of FIG. 9 and then, sequentially executes processes of steps 905 to 915 described below. Then, the CPU proceeds with the process to the step 815 of FIG. 8 via a step 995.

Step 905: The CPU acquires the pump section current IP.

Step 910: The CPU stores the pump section current IP in the backup RAM of the ECU 80 as an oxygen-related pump section current IPox.

Step 915: The CPU acquires the oxygen concentration COX on the basis of a relationship of following formula (12).

In the formula (12), IP is the pump section current acquired at the step 905. Acox and Bcox are constants, respectively which are previously acquired by an experiment or the like for calculating the oxygen concentration COX from the pump section current IP.

$$COX = Acox \times IP + Bcox \quad (12)$$

<Water Concentration Acquisition>

An acquisition of the water concentration carried out by the present diagnosis device will be described. As described above, when the CPU proceeds with the process to the step 820 of FIG. 8, the CPU is configured or programmed to execute the water concentration acquisition routine shown by a flowchart in FIG. 10. Therefore, when the CPU proceeds with the process to the step 820 of FIG. 8, the CPU starts a process from a step 1000 and then, sequentially executes processes of steps 1005 to 1015 described below for acquiring the water concentration CSB.

Step 1005: The CPU starts to increase the pump section voltage VP.

Step 1010: The CPU determines whether or not the pump section voltage VP reaches a water decomposition voltage VSB. When the pump section voltage VP does not reach the water decomposition voltage VSB, the CPU determines "No" at the step 1010 and then, executes the process of the step 1010, again.

On the other hand, when the pump section voltage VP reaches the water decomposition voltage VSB, the CUP determines "Yes" at the step 1010 and then, proceeds with the process to a step 1015.

Step 1015: The CPU stops increasing the pump section voltage VP.

Then, the CPU sequentially executes processes of steps 1020 to 1030 described below for acquiring the water concentration CSB.

Step 1020: The CPU acquires the pump section current IP.

Step 1025: The CPU acquires the oxygen-related pump section current IPox. The oxygen-related pump section current IPox is acquired by the routine of FIG. 9 and is stored in the backup RAM of the ECU 80.

Step 1030: The CPU acquires the water concentration CSB on the basis of a relationship of following formula (13).

In the formula (13), IP is the pump section current acquired at the step 1020, IPox is the oxygen-related pump section current acquired at the step 1025 and Asb and Bsb are constants, respectively which are previously acquired by an experiment or the like for calculating the water concentration CSB on the basis of a difference between the pump section current IP and the oxygen-related pump section current IPox.

$$CSB = Asb \times (IP - IPox) + Bsb \quad (13)$$

Then, the CPU sequentially executes processes of steps 1035 to 1045 described below for returning the pump section voltage VP to a pumping voltage VPMP. Then, the CPU proceeds with the process to the step 825 of FIG. 8 via a step 1095.

Step 1035: The CPU starts to decrease the pump section voltage VP.

Step 1040: The CPU determines whether or not the pump section voltage VP reaches the pumping voltage VPMP. When the pump section voltage VP does not reach the pumping voltage VPMP, the CPU determines "No" at the step 1040 and then, executes the process of the step 1040, again.

On the other hand, when the pump section voltage VP reaches the pumping voltage VPMP, the CPU determines "Yes" at the step 1040 and then, proceeds with the process to a step 1045.

Step 1045: The CPU stops decreasing the pump section voltage VP.

The acquisition of the water concentration carried out by the present diagnosis device has been described.

<Protection Layer Temperature Acquisition>

An acquisition of the protection layer temperature TH carried out by the present diagnosis device will be described.

Figure 11:
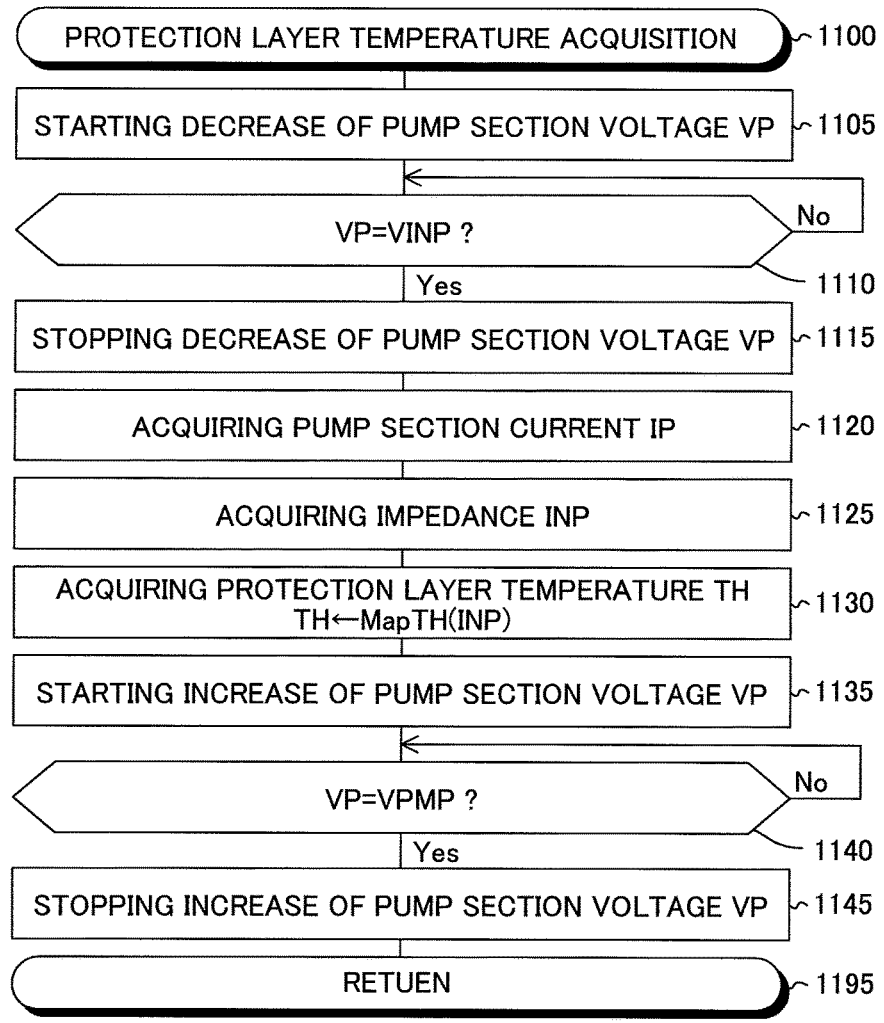
FIG. 11 shows a flowchart of a protection layer temperature acquisition routine executed by the CPU shown in FIG. 1.

As described above, when the CPU proceeds with the process to the step 850 of FIG. 8, the CPU executes the protection layer temperature acquisition routine shown by a flowchart in FIG. 11.

Therefore, when the CPU proceeds with the process to the step 850 of FIG. 8, the CPU starts a process from a step 1110 of FIG. 11 and then, sequentially executes processes of steps 1105 to 1115 described below for acquiring the protection layer temperature TH.

Step 1105: The CPU starts to decrease the pumping voltage VP.

Step 1110: The CPU determines whether or not the pump section voltage VP reaches an impedance acquisition voltage VINP. The impedance acquisition voltage VINP is lower than a voltage of a limiting current area.

When the pump section voltage VP does not reach the impedance acquisition voltage VINP, the CPU determines "No" at the step 1110 and then, executes the process of the step 1110, again.

On the other hand, when the pump section voltage VP reaches the impedance acquisition voltage VINP, the CPU determines "Yes" at the step 1110 and then, proceeds with the process to a step 1115.

When the CPU proceeds with the process to the step 1115, the CPU stops decreasing the pump section voltage VP.

Then, the CPU sequentially executes processes of steps 1120 to 1130 described below for acquiring the protection layer temperature TH.

Step 1120: The CPU acquires the pump section current IP.

Step 1125: The CPU acquires an impedance INP by a known calculation equation on the basis of the pump section current IP and the pump section voltage VP.

Step 1130: The CPU applies the impedance INP to a lookup table MapTH(INP) to acquire the protection layer temperature TH.

According to the table MapTH(INP), the acquired protection layer temperature TH decreases as the impedance INP increases.

Then, the CPU sequentially executes processes of steps 1135 to 1145 described below to return the pump section voltage VP to the pumping voltage VPMP and then, proceeds with the process to the step 855 of FIG. 8 via a step 1195.

Step 1135: The CPU starts to increase the pump section voltage VP.

Step 1140: The CPU determines whether or not the pump section voltage VP reaches the pumping voltage VPMP. When the pump section voltage VP does not reach the pumping voltage VPMP, the CPU determines "No" at the step 1140 and then, executes the process of the step 1140, again.

On the other hand, when the pump section voltage VP reaches the pumping voltage VPMP, the CPU determines "Yes" at the step 1140 and then, proceeds with the process to a step 1145.

When the CPU proceeds with the process to the step 1145, the CPU stops increasing the pump section voltage VP.

The acquisition of the protection layer temperature TH carried out by the present diagnosis device has been described.

Figure 12:
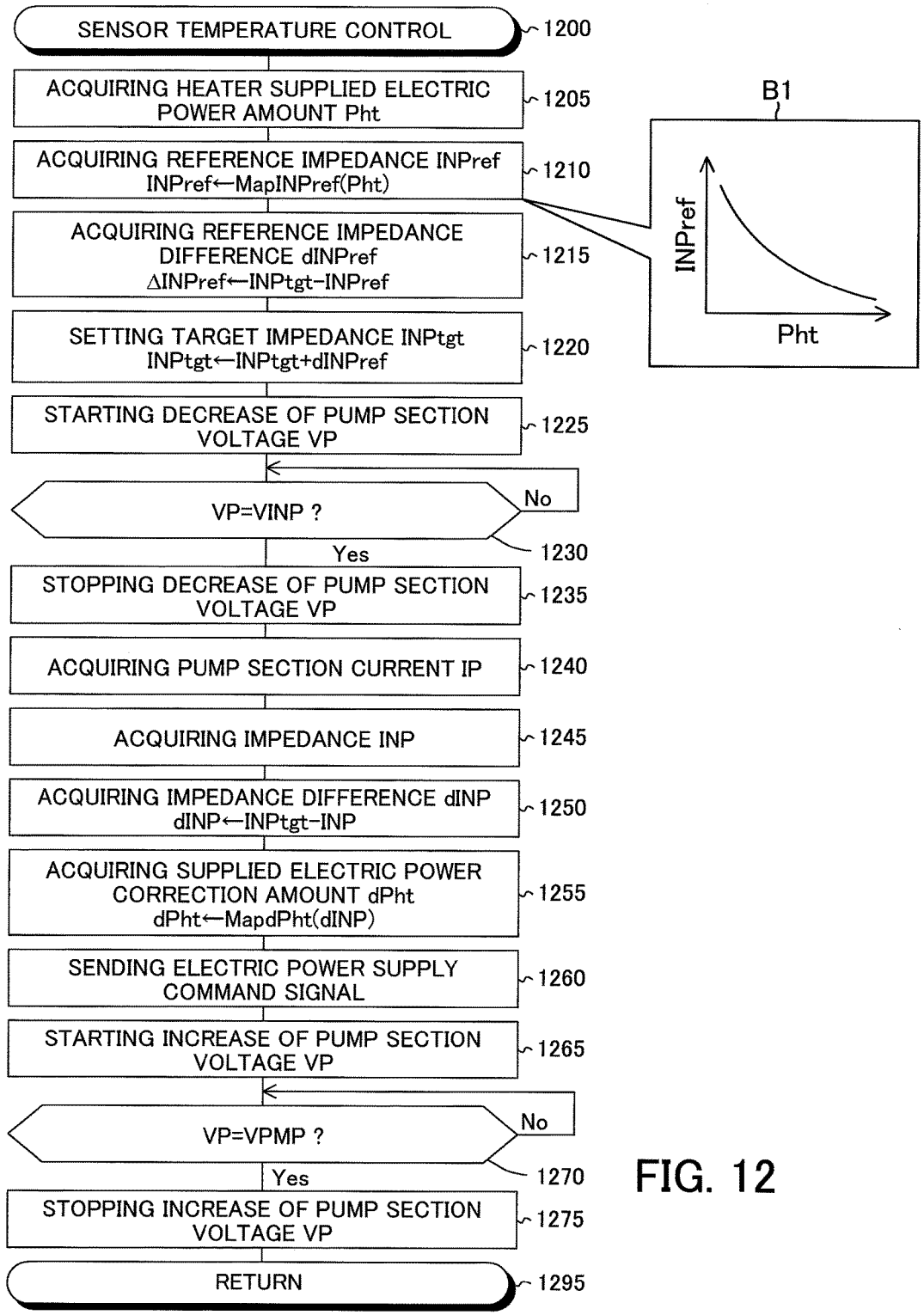
FIG. 12 shows a flowchart of a sensor temperature control routine executed by the CPU shown in FIG. 1.

Further, the CPU of the ECU 80 is configured or programmed to execute a sensor temperature control routine shown by a flowchart in FIG. 12 every an elapse of a predetermined time.

Therefore, at a predetermined timing, the CPU starts a process from a step 1200 of FIG. 12 and then, sequentially executes processes of steps 1205 to 1220 described below for setting a target impedance INPtgt.

Step 1205: The CPU acquires, as a heater supplied electric power amount Pht, an amount of electric power supplied to the heater layer 92 from an electric power source (not shown) for causing the heater layer 92 to produce heat on the basis of electric voltage applied to the heater layer 92 and electric current flowing in the heater layer 92.

Step 1210: The CPU applies the heater supplied electric power amount Pht to a lookup table MapINPref(Pht) to acquire a reference impedance INPref.

The reference impedance INPref is an impedance which is expected to be acquired from the electric voltage applied by the pump section 95 to between the electrodes 94a and 94b and the electric current flowing in the pump section 95 when no deterioration due to thermal aggregation does not occur in the electrodes 94a and 94b of the pump section 95 (see FIG. 2) when the electric power having the heater supplied electric power amount Pht acquired at the step 1205 is supplied to the heater layer 92.

Further, according to the table MapINPref(Pht), as shown in a block B2 of FIG. 12, the acquired reference impedance INPref decreases as the heater supplied electric power amount Pht increases.

Step 1215: The CPU subtracts the reference impedance INPref acquired at the step 1210 from the target impedance INPtgt to acquire a reference impedance difference dINPref. The reference impedance difference dINPref indicates a change of the relationship between the protection layer temperature TH and the impedance due to a deterioration of the electrode 94a and/or the electrode 94b.

Step 1220: The CPU adds the reference impedance difference dINPref to the present target impedance INPtgt to set a new target impedance INPtgt (i.e., correct the present target impedance INPtgt).

Then, the CPU sequentially executes processes of steps 1225 to 1245 described below for acquiring the impedance INP.

Step 1225: The CPU starts to decrease the pumping voltage VP.

Step 1230: The CPU determines whether or not the pump section voltage VP reaches the impedance acquisition voltage VINP. The impedance acquisition voltage VINP is lower than an electric voltage of a limiting current area.

When the pump section voltage VP does not reaches the impedance acquisition voltage VINP, the CPU determines "No" at the step 1230 and then, executes the determination of the step 1230, again.

On the other hand, when the pump section voltage VP reaches the impedance acquisition voltage VINP, the CPU determines "Yes" at the step 1230 and then, proceeds with the process to a step 1235.

Step 1235: The CPU stops decreasing the pump section voltage VP.

Step 1240: The CPU acquires the pump section current IP.

Step 1245: the CPU acquires the impedance INP by a known calculation equation on the basis of the pump section current IP and the pump section voltage VP.

Then, the CPU executes processes of steps 1250 and 1255 described below for acquiring a supplied electric power correction amount dPht. The supplied electric power correction amount dPht is an amount for correcting the heater supplied electric power amount Pht to cause the impedance INP to correspond to the target impedance INPtgt.

Step 1250: The CPU subtracts the impedance INP acquired at the step 1245 from the target impedance INPtgt to acquire the impedance difference dINP.

Step 1255: The CPU applies the impedance difference dINP to a lookup table MapdPht(dINP) to acquire the supplied electric power correction amount dPht.

According to the table MapdPht(dINP), when the impedance difference dINP is a positive value, the acquired supplied electric power correction amount dPht is a negative value and an absolute value of the acquired supplied electric power correction amount dPht increases as an absolute value of the impedance difference dINP increases. On the other hand, when the impedance difference dINP is a negative value, the acquired supplied electric power correction amount dPht is a positive value and the absolute value of the acquired supplied electric power correction amount dPht increases as the absolute value of the impedance difference dINP increases.

Then, the CPU proceeds with the process to a step 1260 to send a command signal to an electric power source (not shown) for supplying electric power to the heater layer 92 in accordance with the supplied electric power correction amount dPht acquired at the step 1260. When the supplied electric power correction amount dPht is a positive value, an amount of electric power supplied to the heater layer 92 is increased. On the other hand, when the supplied electric power correction amount dPht is a negative value, an amount of electric power supplied to the heater layer 92 is decreased.

Then, the CPU sequentially executes processes of steps 1265 to 1275 described below for returning the pump section voltage VP to the pumping voltage VPMP. Then, the CPU proceeds with the process to a step 1295 to terminate the execution of this routine once.

Step 1265: The CPU starts to increase the pumping voltage VP.

Step 1270: The CPU determines whether or not the pump section voltage VP reaches the pumping voltage VPMP.

When the pump section voltage VP does not reach the pumping voltage VPMP, the CPU determines "No" at the step 1270 and then, executes the determination of the step 1270, again.

On the other hand, when the pump section voltage VP reaches the pumping voltage VPMP, the CPU determines "Yes" at the step 1270 and then, proceeds with the process to a step 1275.

When the CPU proceeds with the process to the step 1275, the CPU stops increasing the pump section voltage VP.

The sensor temperature control according to this embodiment has been described. According to the sensor temperature control, a sensor element temperature, which is a temperature of the sensor element 77a, is controlled while a change of the impedance property (i.e., a relationship between the sensor element temperature and the impedance INP) derived from deterioration such as thermal aggregation of the electrodes 94a and 94b of the pump section 95 is compensated (see the step 1215 of FIG. 12).

As described above, the present diagnosis device acquires the sensor section currents IS_N and IS_A which the downstream NOx concentration sensor 77 is estimated to output when the NOx purification rate RNOX of the SCR catalyst 53c decreases to the predetermined purification rate in consideration of the protection layer temperature TH (i.e., the sensor element temperature).

Therefore, for the acquisition of the sensor section currents IS_N and IS_A, the sensor element temperature (i.e., the protection layer temperature TH) is used while a change of the impedance property derived from deterioration such as thermal aggregation of the electrodes 94a and 94b of the pump section 95 is compensated.

As a result, the present diagnosis device corrects the base sensor section currents IS_NOb and IS_Ab on the basis of a change of the impedance property derived from deterioration such as thermal aggregation of the electrodes 94a and 94b of the pump section 95.

Further, according to the sensor temperature control described above, the sensor element temperature is controlled to the target temperature in consideration an increase of a temperature of the downstream NOx concentration sensor 77 derived from heat of the exhaust gas reaching the downstream NOx concentration sensor 77. As a result, the present diagnosis device corrects the base sensor section currents IS_NOb and IS_Ab on the basis of an increase of the sensor element temperature derived from heat of the exhaust gas.

In addition, since the temperature of the exhaust gas reaching the downstream NOx concentration sensor 77 is high, the sensor element temperature (i.e., the protection layer temperature TH) may be higher than the target temperature even when the supply of electric power to the heater layer 92 is stopped. Also in this case, the sensor element temperature exactly appears as an impedance. Therefore, under the condition that the sensor element temperature (i.e., the protection layer temperature TH) is higher than the target temperature when the supply of electric power to the heater layer 92 is stopped, the present diagnosis device corrects the base sensor section currents IS_NOb and IS_Ab on the basis of the sensor element temperature which corresponds to a temperature of the downstream NOx concentration sensor 77 after the downstream NOx concentration sensor 77 is heated by the exhaust gas.

<Malfunction Diagnosis>

Figure 13:
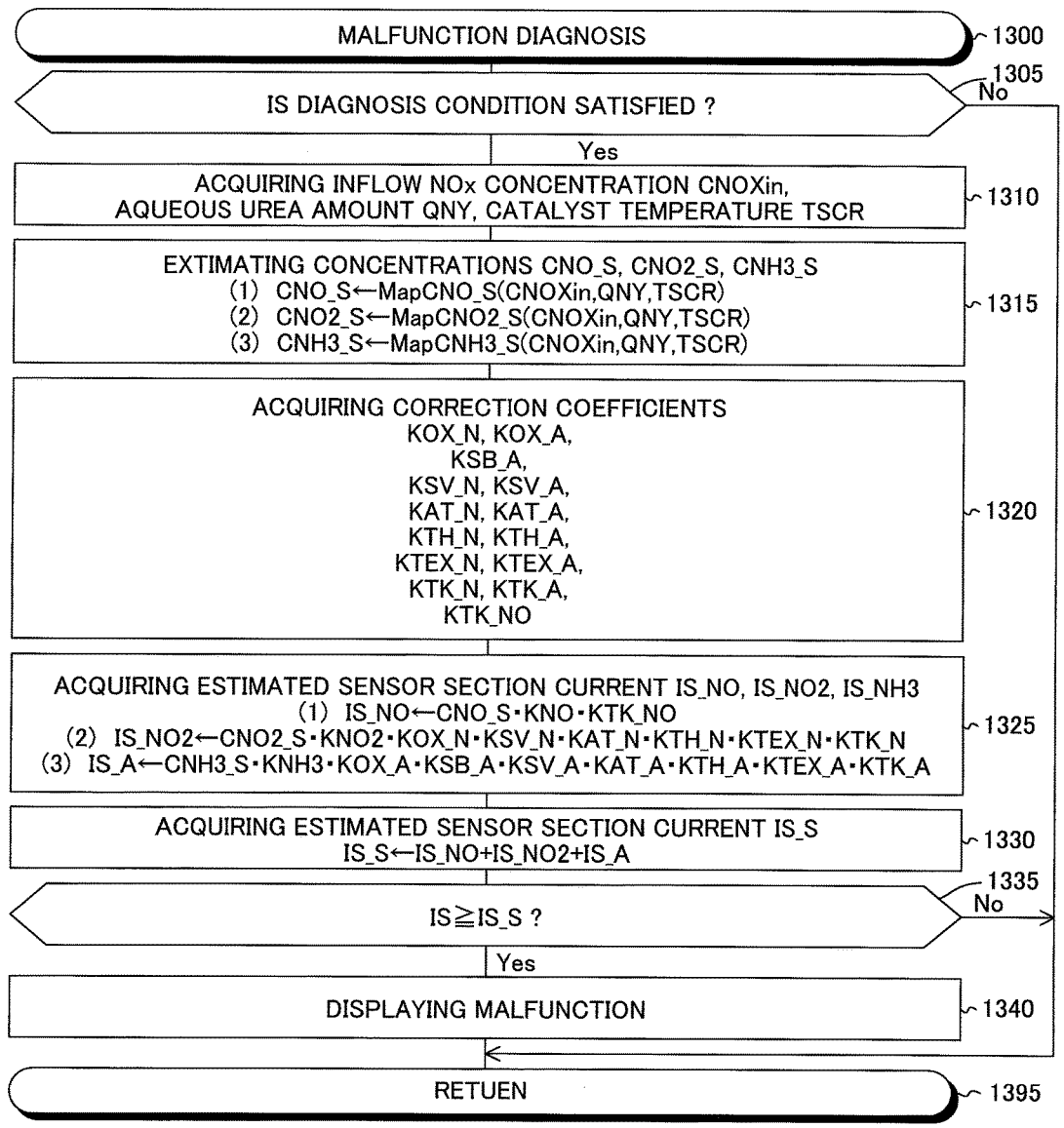
FIG. 13 shows a flowchart of a malfunction diagnosis routine executed by the CPU shown in FIG. 1.

A malfunction diagnosis carried out by the present diagnosis device will be described. The CPU is configured or programmed to execute a malfunction diagnosis routine shown by a flowchart in FIG. 13 every an elapse of a predetermined time. Therefore, at a predetermined timing, the CPU starts a process from a step 1300 and then, proceeds with the process to a step 1305 to determine whether or not a diagnosis condition is satisfied.

The diagnosis condition is satisfied when following conditions (1) to (3) are satisfied.

(1) The temperature of the engine 10 is equal to or higher than a predetermined temperature. That is, a warming of the engine 10 is completed.

(2) The SCR catalyst 53c is activated. That is, a warming of the SCR catalyst 53c is completed.

(3) The downstream NOx concentration sensor 77 is activated. That is, a warming of the downstream NOx concentration sensor 77 is completed.

When the diagnosis condition is not satisfied, the CPU determines "No" at the step 1305 and then, proceeds with the process to a step 1395 to terminate the execution of this routine once.

On the other hand, when the diagnosis condition is satisfied, the CPU determines "Yes" at the step 1305 and then, sequentially executes processes of steps 1310 to 1330 described below.

Step 1310: The CPU acquires the inflow NOx concentration CNOXin which is a NOx concentration of the exhaust gas flowing into the SCR catalyst 53c, the aqueous urea amount QNY which is an amount of aqueous urea added from the aqueous urea addition device 54 and the temperature TSCR of the SCR catalyst 53c.

The inflow NOx concentration CNOXin is acquired on the basis of a signal output from the upstream NOx concentration sensor 76 by a process separately executed by the CPU and is stored in the backup RAM of the ECU 80. The temperature TSCR of the SCR catalyst 53c is acquired on the basis of a signal output from the temperature sensor 81 by a process separately executed by the CPU and is stored in the backup RAM of the ECU 80.

Step 1315: The CPU applies the inflow NOx concentration CNOXin, the aqueous urea amount QNY and the temperature TSCR of the SCR catalyst 53c to MapCNO_S (CNOXin,QNY,TSCR), MapCNO2_S(CNOXin,QNY, TSCR) and MapCNH3_S(CNOXin,QNY,TSCR) to acquire the estimated nitrogen monoxide concentration CNO_S, the estimated nitrogen dioxide concentration CNO2_S and the estimated ammonia concentration CNH3_S.

The nitrogen monoxide concentration CNO_S acquired at the step 1315 is a concentration of nitrogen monoxide included in the exhaust gas which is expected to flow out from the SCR catalyst 53c when the NOx purification rate RNOX of the SCR catalyst 53c decreases to the predetermined purification rate.

According to the table MapCNO_S(CNOXin,QNY, TSCR), the acquired estimated nitrogen monoxide concentration CNO_S increases as the inflow NOx concentration CNOXin increases.

Further, the acquired estimated nitrogen monoxide concentration CNO_S decreases as the aqueous urea amount QNY increases within a range smaller than a constant amount and the acquired estimated nitrogen monoxide concentration CNO_S is a smallest constant value when the aqueous urea amount QNY is larger than the constant amount.

In addition, the acquired estimated nitrogen monoxide concentration CNO_S decreases as the temperature TSCR of the SCR catalyst 53c increases as far as the temperature TSCR of the SCR catalyst 53c is equal to or higher than an activation start temperature and is equal to or lower than a constant temperature and the acquired estimated nitrogen monoxide concentration CNO_S increases as the temperature TSCR of the SCR catalyst 53c increases as far as the temperature TSCR of the SCR catalyst 53c is higher than the constant temperature and is equal to or lower than an activation limit temperature.

Further, the nitrogen dioxide concentration CNO2_S acquired at the step 1315 is a concentration of nitrogen dioxide included in the exhaust gas which is estimated to flow out from the SCR catalyst 53c when the NOx purification rate RNOX of the SCR catalyst 53c decreases to the predetermined purification rate.

According to the table MapCNO2_S(CNOXin,QNY, TSCR), the acquired estimated nitrogen dioxide concentration CNO2_S increases as the inflow NOx concentration CNOXin increases.

Further, the acquired estimated nitrogen dioxide concentration CNO2_S decreases as the aqueous urea amount QNY increases as far as the aqueous urea amount QNY is equal to or lower than a constant amount and the acquired estimated nitrogen dioxide concentration CNO2_S is a smallest constant value when the aqueous urea amount QNY is larger than the constant amount.

In addition, the acquired estimated nitrogen dioxide concentration CNO2_S decreases as the temperature TSCR of the SCR catalyst 53c is increases as far as the temperature TSCR of the SCR catalyst 53c is equal to or higher than the activation start temperature and is equal to or lower than a constant temperature and the acquired estimated nitrogen dioxide concentration CNO2_S increases as the temperature TSCR of the SCR catalyst 53c increases as far as the temperature TSCR of the SCR catalyst 53c is higher than the constant temperature and is equal to or lower than the activation limit temperature.

In addition, the estimated ammonia concentration CNH3_S acquired at the step 1315 is a concentration of ammonia included in the exhaust gas which is expected to flow out from the SCR catalyst 53c when the NOx purification rate RNOX of the SCR catalyst 53c decreases to the predetermined purification rate.

According to the table MapCNH3_S(CNOXin,QNY, TSCR), the acquired estimated ammonia concentration CNH3_S increases as the inflow NOx concentration CNOXin increases.

Further, the acquired estimated ammonia concentration CNH3_S increases as the aqueous urea amount QNY increases.

In addition, the acquired estimated ammonia concentration CNH3_S decreases as the temperature TSCR of the SCR catalyst 53c increases as far as the temperature TSCR of the SCR catalyst 53c is equal to or higher than the activation start temperature and is equal to or lower than a constant temperature and the acquired estimated ammonia concentration CNH3_S increases as the temperature TSCR of the SCR catalyst 53c increases as far as the temperature TSCR of the SCR catalyst 53c is higher than the constant temperature and is equal to or lower than the activation limit temperature.

Step 1320: The CPU acquires the correction coefficients KOX_N, KOX_A, KSB_A, KSV_N, KSV_A, KAT_N, KAT_A, KTH_N, KTH_A, KTEX_N, KTEX_A, KTK_N, KTK_A and KTK_NO acquired in the routine of FIG. 8.

Step 1325: The CPU acquires the estimated sensor section currents IS_NO, IS_NO2 and IS_A by using the correction coefficients acquired at the step 1320 in accordance with following equations (14) to (16), respectively. In the following equations (14) to (16), KNO is the nitrogen monoxide conversion coefficient, KNO2 is the nitrogen dioxide conversion coefficient and KNH3 is the ammonia conversion coefficient.

$$IS\_NO = CNO\_S \times KNO \times KTK\_NO \quad (14)$$

$$IS\_NO2 = CNO2\_S \times KNO2 \times KOX\_N \times KSV\_N \times KAT\_N \times KTH\_N \times KTEX\_N \times KTK\_N \quad (15)$$

$$IS\_A = CNH3\_S \times KNH3 \times KOX\_A \times KSB\_A \times KSV\_A \times KAT\_A \times KTH\_A \times KTEX\_A \times KTK\_A \quad (16)$$

Step 1330: The CPU sums the estimated sensor section currents IS_NO, IS_NO2 and IS_A in accordance with a following equation (17) to acquire the estimated sensor section current IS_S.

$$IS\_S = IS\_NO + IS\_NO2 + IS\_A \quad (17)$$

Then, the CPU proceeds with the process to a step 1335 to determine whether or not the actual sensor section current IS of the downstream NOx concentration sensor 77 is equal to or larger than the estimated sensor section current IS_S. When the sensor section current IS is smaller than the estimated sensor section current IS_S, the CPU determines "No" at the step 1335 and then, proceeds with the process to the step 1395 to terminate the execution of this routine once. In this case, no malfunction occurs in the SCR catalyst 53c and thus, the SCR catalyst 53c is in a normal state.

On the other hand, when the sensor section current IS is equal to or larger than the estimated sensor section current IS_S, the CPU determines "Yes" at the step 1335 and then, proceeds with the process to a step 1340 to cause a display device (not shown) to indicate that a malfunction occurs in the SCR catalyst 53c.

Then, the CPU proceeds with the process to the step 1395 to terminate the execution of this routine once. The malfunction diagnosis of the SCR catalyst 53c carried out by the present diagnosis device has been described.

In the embodiment described above, when the actual sensor section current IS is equal to or larger than the estimated sensor section current IS_S, it is diagnosed that a malfunction occurs in the SCR catalyst 53c. Alternatively, when the actual sensor section current IS is equal to or larger than a threshold which is larger or smaller than the estimated sensor section current IS_S by a predetermined value, it may be diagnosed that a malfunction occurs in the SCR catalyst 53c. In other words, when the actual sensor section current IS is equal to or larger than a malfunction diagnosis threshold defined on the basis of the estimated sensor section current IS_S, it is diagnosed that a malfunction occurs in the SCR catalyst 53c.

Further, in the embodiment described above, the reactions of the nitrogen dioxide and the ammonia in the protection layer 99 of the downstream NOx concentration sensor 77 are considered for the acquisition of the estimated sensor section current IS_S. However, when nitrogen monoxide is produced from the nitrogen dioxide and the ammonia is converted to the nitrogen in the diffusion resistance layer 93 of the downstream NOx concentration sensor 77, similar to the embodiment described above, the reactions of the nitrogen dioxide and the ammonia in the diffusion resistance layer 93 may be considered for the acquisition of the estimated sensor section current IS_S.

Further, when nitrogen monoxide is produced from the nitrogen dioxide and ammonia is converted to nitrogen in the diffusion resistance layer 93 of the downstream NOx concentration sensor 77, the present diagnosis device can be applied to an internal combustion engine provided with the downstream NOx concentration sensor 77 which does not include the protection layer 99. In this case, similar to the embodiment described above, the reactions of nitrogen dioxide and ammonia in the diffusion resistance layer 93 are considered for the acquisition of the estimated sensor section current IS_S.

Further, the present diagnosis device can be applied to an internal combustion engine provided with a NOx concentration sensor which does not include the pump section 95. In addition, the present diagnosis device can be applied to an internal combustion engine provided with a NOx concentration sensor which can produce nitrogen monoxide from ammonia at the sensor electrode 94e.

Further, the present diagnosis device can be applied to an internal combustion engine provided with the downstream NOx concentration sensor 77 which includes an atmospheric air introduction hole. In this case, there is no hydrocarbon and no carbon monoxide in the downstream NOx concentration sensor 77 or there is almost no hydrocarbon and almost no carbon monoxide in the downstream NOx concentration sensor 77. Therefore, it is not necessary to correct the base sensor section currents IS_NO, IS_N and IS_A by the consumption correction coefficients KTK_N, KTK_A and KTK_NO.

Further, in the embodiment described above, a flow speed of the exhaust gas may be used in place of the exhaust gas flow rate SV. In this case, a value obtained by multiplying the intake air amount by the exhaust gas temperature may be used as the flow speed of the exhaust gas.

Further, the present diagnosis device can be applied to a gasoline engine.

What is claimed is:

1. A malfunction diagnosis device for an exhaust gas purification catalyst of an internal combustion engine, comprising:

an exhaust passage;

an exhaust gas purification catalyst provided in the exhaust passage for reducing nitrogen monoxide included in exhaust gas by ammonia to purify the nitrogen monoxide; and a NOx concentration sensor provided in the exhaust passage downstream of the exhaust gas purification catalyst for detecting a NOx concentration of the exhaust gas, the NOx concentration sensor including a diffusion layer made of porous material, through which the exhaust gas can pass, and an electrode part for reducing nitrogen monoxide included in the exhaust gas, which has passed through the diffusion layer to convert the nitrogen monoxide to nitrogen and outputting an output value depending on an amount of reduction of the nitrogen monoxide at the electrode part, the malfunction diagnosis device comprising a malfunction diagnosis section for diagnosing a malfunction of the exhaust gas purification catalyst, wherein an amount of nitrogen monoxide, produced from a particular component included in the exhaust gas when the exhaust gas passes through the diffusion layer, is a first amount when an influence parameter value is a first value, the influence parameter value being a value of an influence parameter which influences a reaction of the particular component when the particular component passes through the diffusion layer, the reaction of the particular component changing an amount of nitrogen monoxide reaching the electrode part, an amount of nitrogen monoxide, produced from the particular component when the particular component passes through the diffusion layer, is a second amount larger than the first amount when the influence parameter value is a second value, the malfunction diagnosis part is programmed:

to calculate, on the basis of a parameter of the engine other than the output value of the NOx concentration sensor, (a) an estimated nitrogen monoxide concentration which is a concentration of nitrogen monoxide included in the exhaust gas and expected to flow out from the exhaust gas purification catalyst and (b) an estimated particular component concentration which is a concentration of the particular component included in the exhaust gas and expected to flow out from the exhaust gas purification catalyst;

to calculate an expected output value such that the expected output value calculated when the influence parameter value is the first value is smaller than the expected output value calculated when the influence parameter value is the second value, the expected output value being an output value which is expected to be output from the NOx concentration sensor when the exhaust gas, which includes nitrogen monoxide having the expected nitrogen monoxide concentration and the particular component having the expected particular component concentration, reaches the NOx concentration sensor; and to diagnose that a malfunction occurs in the exhaust gas purification catalyst when the output value of the NOx concentration sensor is equal to or larger than a malfunction diagnosis threshold defined on the basis of the expected output value.

2. The malfunction diagnosis device for the exhaust gas purification catalyst of the engine according to claim 1, wherein that the particular component is ammonia.

3. The malfunction diagnosis device for the exhaust gas purification catalyst of the engine according to claim 1, wherein the particular component is nitrogen dioxide.

4. The malfunction diagnosis device for the exhaust gas purification catalyst of the engine according to claim 1, wherein the influence parameter is a parameter which changes a speed of a reaction for producing a component other than the particular component from the particular component.

5. The malfunction diagnosis device for the exhaust gas purification catalyst of the engine according to claim 4, wherein the influence parameter is at least one of (a) a concentration of oxygen included in the exhaust gas reaching the NOx concentration sensor, (b) a temperature of the exhaust gas reaching the NOx concentration sensor, (c) a concentration of water included in the exhaust gas reaching the NOx concentration sensor and (d) a temperature of the diffusion layer.

6. The malfunction diagnosis device for the exhaust gas purification catalyst of the engine according to claim 1, wherein the influence parameter is a parameter which changes a time of the particular component to stay in the diffusion layer.

7. The malfunction diagnosis device for the exhaust gas purification catalyst of the engine according to claim 6, wherein the influence parameter is at least one of (a) a flow rate of the exhaust gas reaching the NOx concentration sensor and (b) a thickness of the diffusion layer in a direction of passage of the exhaust gas through the diffusion layer toward the electrode part.

* * * * *